(12) United States Patent
Shank et al.

(10) Patent No.: US 8,141,794 B2
(45) Date of Patent: *Mar. 27, 2012

(54) VEHICLE WINDSHIELD CLEANING SYSTEM

(75) Inventors: David Shank, Hershey, MI (US); John Washeleski, Cadillac, MI (US); Peter Strom, Big Rapids, MI (US); John Mitchell, Newago, MI (US)

(73) Assignee: SBR Investments Company LLC, Reed City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/698,360

(22) Filed: Feb. 2, 2010

(65) Prior Publication Data

US 2010/0133356 A1      Jun. 3, 2010

Related U.S. Application Data

(60) Division of application No. 12/182,353, filed on Jul. 30, 2008, now Pat. No. 7,673,814, which is a division of application No. 10/894,266, filed on Jul. 19, 2004, now Pat. No. 7,641,131, which is a continuation-in-part of application No. 10/653,827, filed on Sep. 3, 2003, now Pat. No. 6,902,118, which is a continuation-in-part of application No. 10/269,647, filed on Oct. 11, 2002, now Pat. No. 6,851,624.

(60) Provisional application No. 60/415,552, filed on Oct. 2, 2002, provisional application No. 60/551,571, filed on Mar. 9, 2004.

(51) Int. Cl.
*B05B 1/24* (2006.01)
*B05B 1/10* (2006.01)
*B60S 1/46* (2006.01)
*F24H 1/10* (2006.01)

(52) U.S. Cl. ............... 239/130; 239/135; 239/284.1; 392/481

(58) Field of Classification Search ............ 239/13, 239/75, 128–130, 135, 284.1, 284.2; 392/441, 392/443, 447, 449–451, 455, 471, 478, 480, 392/481, 485, 488, 458, 459, 461, 465, 468; 219/202; 165/41, 42

See application file for complete search history.

(56) References Cited

U.S. PATENT DOCUMENTS 4,090,668 A    5/1978    Kochenour
(Continued)

FOREIGN PATENT DOCUMENTS

EP    0219126    4/1987
(Continued)

OTHER PUBLICATIONS

International Search Report and Written Opinion (8 pages) for International Application No. PCT/US08/07878, mailing date Sep. 29, 2008.

(Continued)

*Primary Examiner* — Darren W Gorman
(74) *Attorney, Agent, or Firm* — Tarolli, Sundheim, Covell & Tummino LLP

(57) ABSTRACT

Apparatus and method for providing a heated cleaning fluid to a vehicle surface. The apparatus has an inlet port for receiving an amount of fluid; an outlet port for dispensing an amount of heated fluid; a heating element that heats up fluid passing from the inlet to the outlet; and a control circuit for energizing at least a portion of the heating element with a voltage to heat the fluid passing from the inlet to the outlet.

11 Claims, 20 Drawing Sheets

U.S. PATENT DOCUMENTS

| | | | |
|---|---|---|---|
| 4,233,494 A | 11/1980 | Pawlik et al. | |
| 4,508,957 A | 4/1985 | Rocchitelli | |
| 5,012,977 A | 5/1991 | Karklins et al. | |
| 5,354,965 A | 10/1994 | Lee | |
| 5,509,606 A | 4/1996 | Breithaupt et al. | |
| 5,927,608 A | 7/1999 | Scorsiroli | |
| 5,957,384 A | 9/1999 | Lansinger | |
| 6,029,908 A | 2/2000 | Petzold | |
| 6,032,324 A * | 3/2000 | Lansinger | 15/250.04 |
| 6,133,546 A | 10/2000 | Bains | |
| 6,164,564 A | 12/2000 | Franco et al. | |
| 6,364,010 B1 | 4/2002 | Richman et al. | |
| 6,465,765 B2 | 10/2002 | Katayama et al. | |
| 6,601,776 B1 | 8/2003 | Oljaca et al. | |
| 6,615,438 B1 | 9/2003 | Franco et al. | |
| 6,669,109 B2 | 12/2003 | Ivanov et al. | |
| 6,892,417 B2 | 5/2005 | Franco et al. | |
| 6,952,524 B2 | 10/2005 | Bissonnette et al. | |
| 7,108,754 B2 | 9/2006 | Franco et al. | |
| 7,128,136 B2 | 10/2006 | Gregory | |
| 2001/0017296 A1 * | 8/2001 | Katayama et al. | 219/630 |
| 2002/0137455 A1 * | 9/2002 | Ivanov et al. | 454/157 |
| 2003/0042328 A1 * | 3/2003 | Wojan et al. | 239/284.1 |
| 2003/0141381 A1 | 7/2003 | Bissonnette | |
| 2003/0222156 A1 | 12/2003 | Bissonnette | |
| 2004/0170411 A1 | 9/2004 | Kuebler et al. | |
| 2004/0226127 A1 | 11/2004 | Kaplan | |
| 2005/0083638 A1 | 4/2005 | Warren et al. | |
| 2006/0196448 A1 | 9/2006 | Hayworth et al. | |

FOREIGN PATENT DOCUMENTS

| | | |
|---|---|---|
| EP | 1213197 | 6/2002 |
| FR | 2763549 | 11/1998 |
| GB | 2253339 | 9/1992 |
| WO | WO98/58826 | 12/1998 |
| WO | WO 02/092237 | 11/2002 |

OTHER PUBLICATIONS

Jacobs Electronics Safe-Vue Heater Brochure, pp. 1-4, at least as early as Jun. 28, 2002.

1 page Valeo OPTI-Wash spec sheet, date unknown.

3 page website, www.aaro.ca/BreakingNews/Sept26-Oct17-01NwsBfs.html, posted Oct. 1, 2001.

4 page installation and owner's manual, Safe-Vue Heater, kit # 250-6652, Rostra Precision Controls, Inc. (1999).

1 page website, www.buthotshot.com/choos.asp?ins=2, (Jan. 2003).

4 page website, www.buyhotshot.com/faq.asp?ins=8, (Jan. 2003).

Bennett, "Hot water clears icy windshields", 2 pages, Free Press, date unknown.

2 page website, www.theautochannel.com/news/2001/09/20-29185/html, "Valeo Maximizes Driver Visibility with OPTI-Wash Heated Wash System" (Jun. 2003).

1 page website, www.ai-online.com/issues/articledetail.asp?id=22 (Jun. 2003).

* cited by examiner

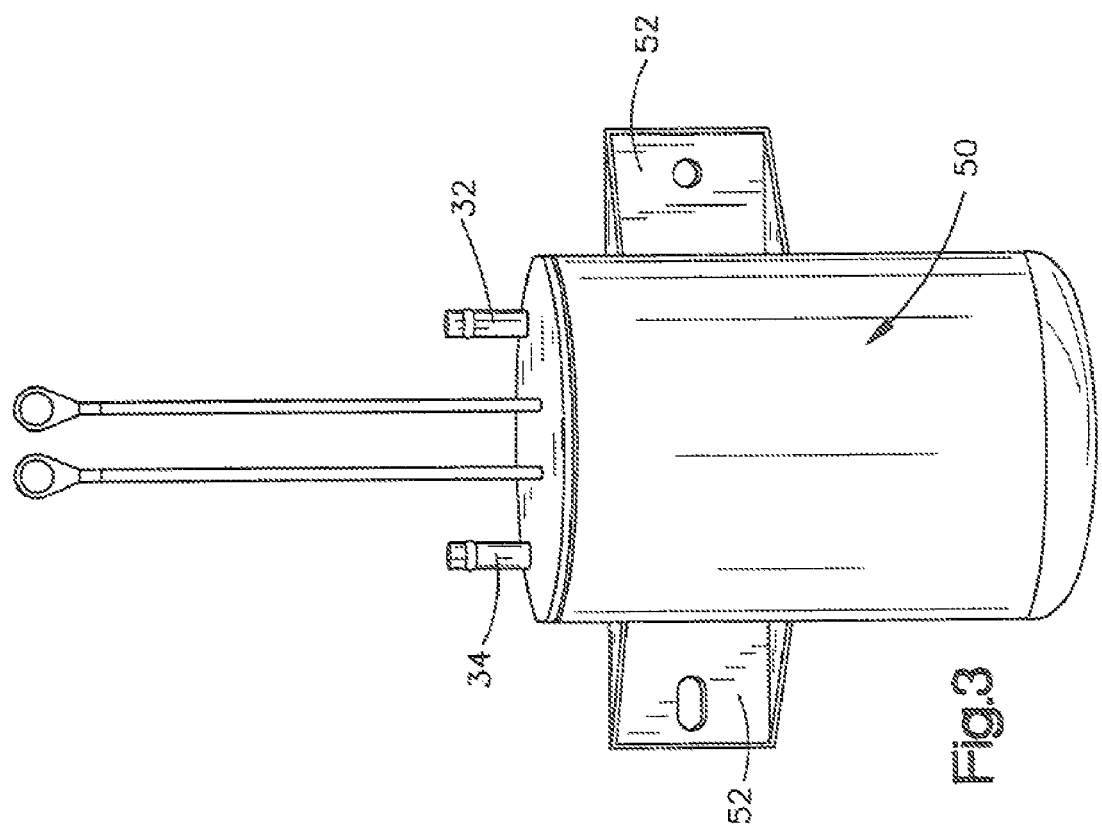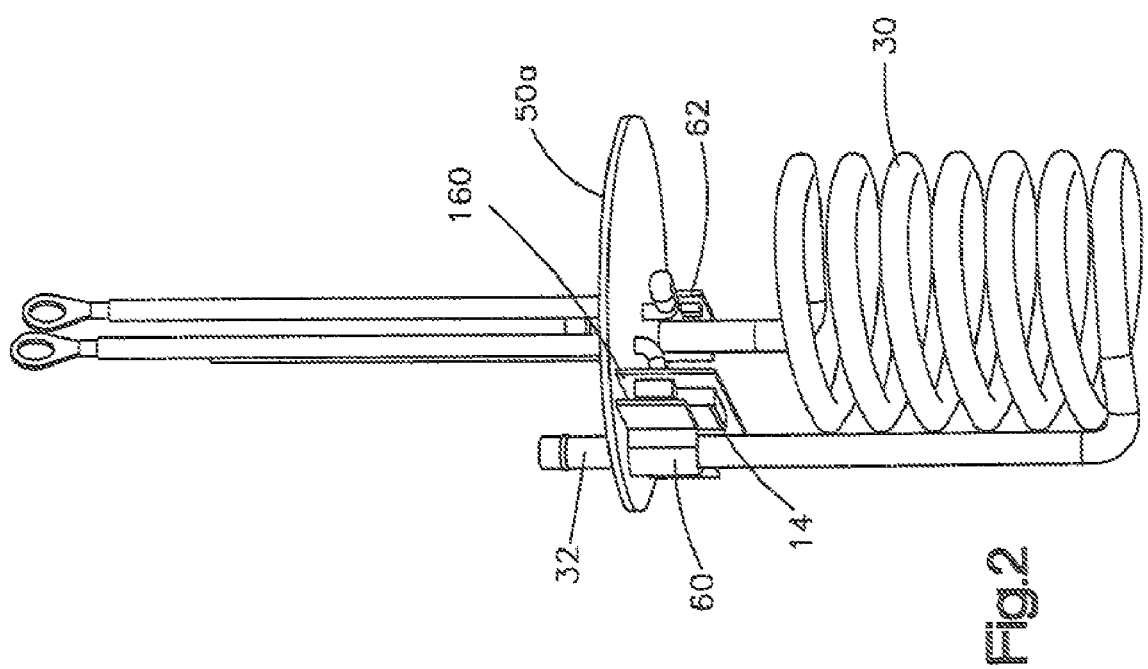

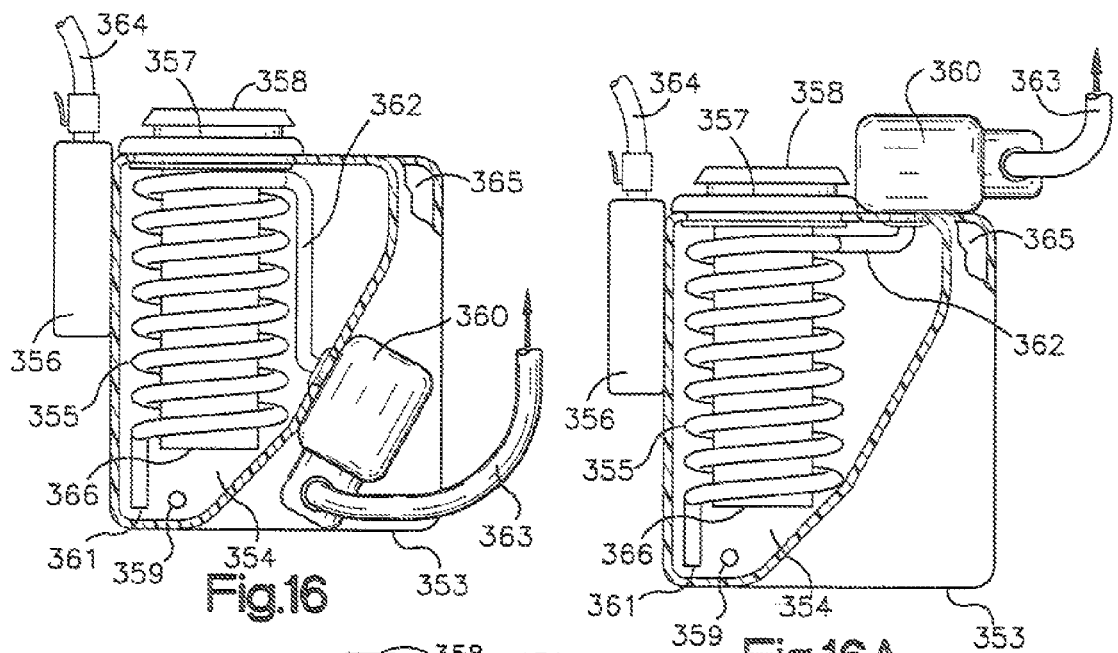
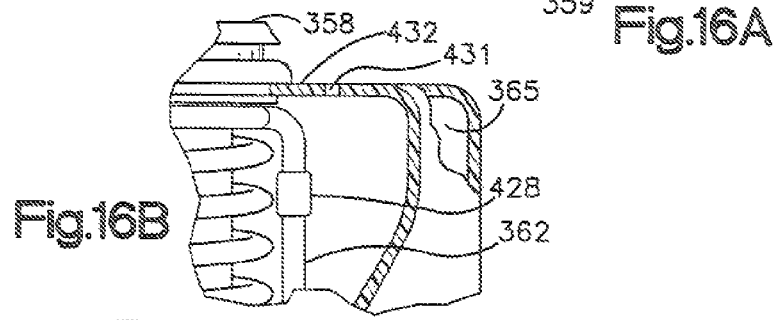
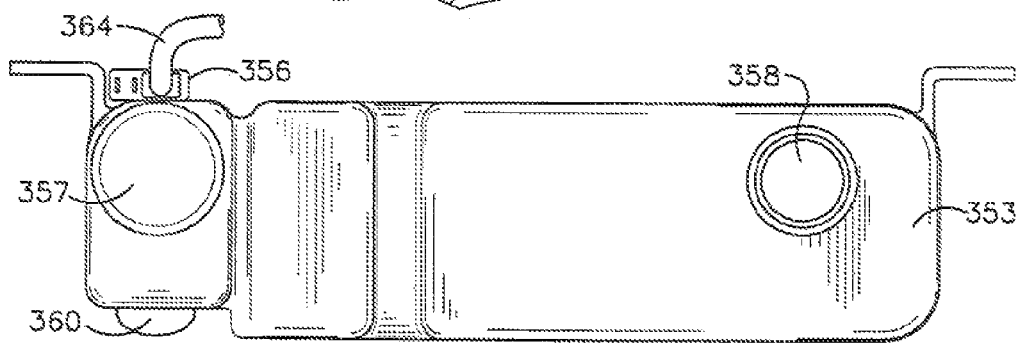
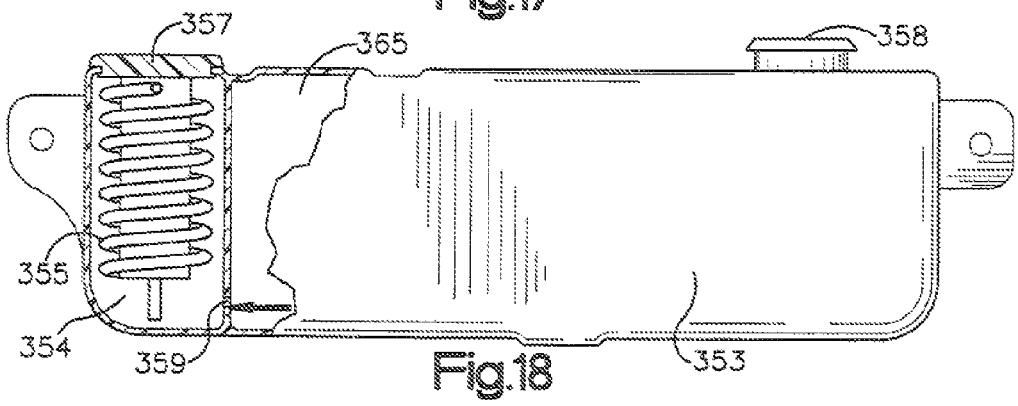

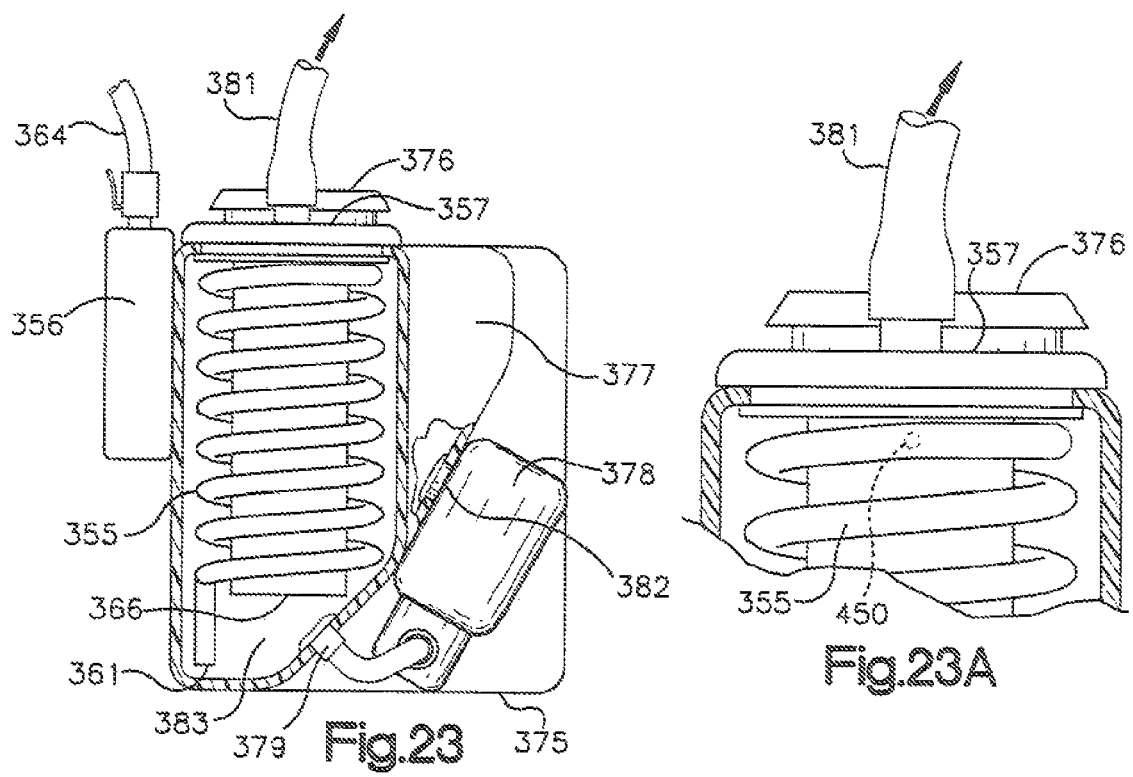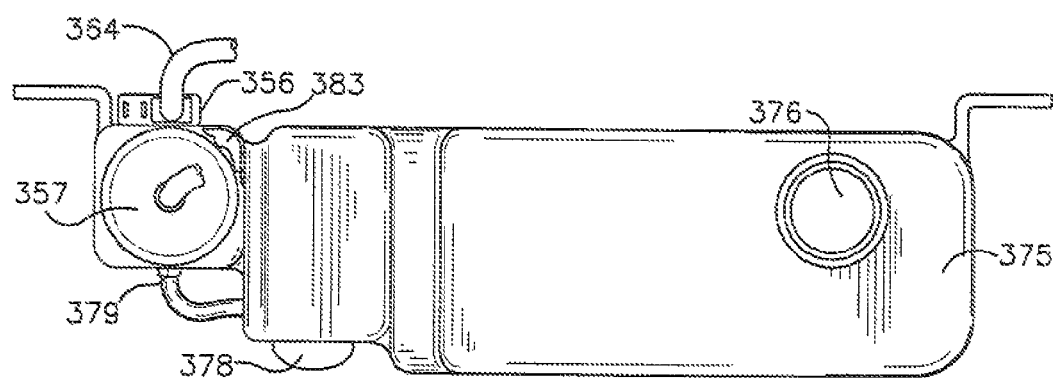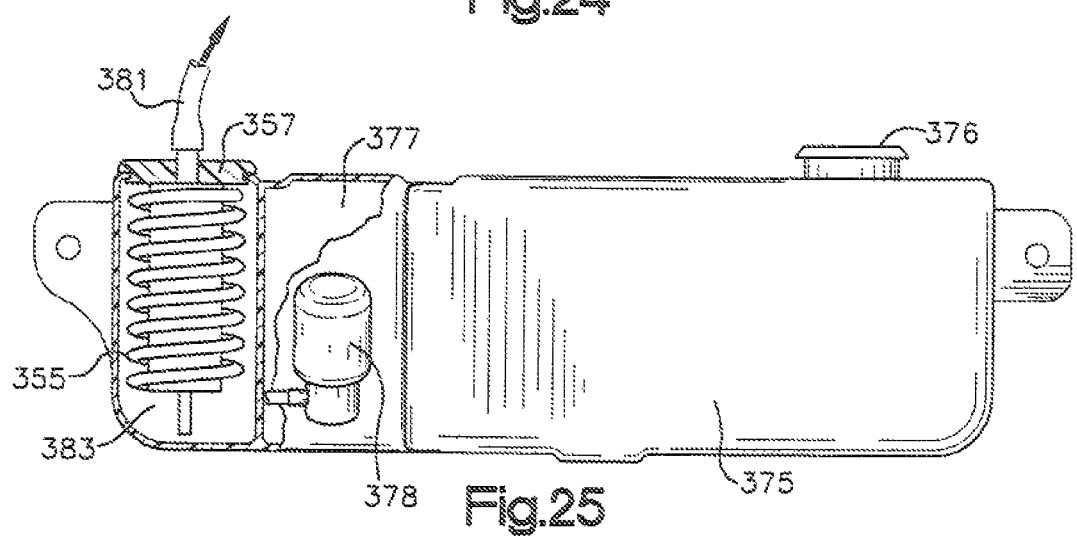

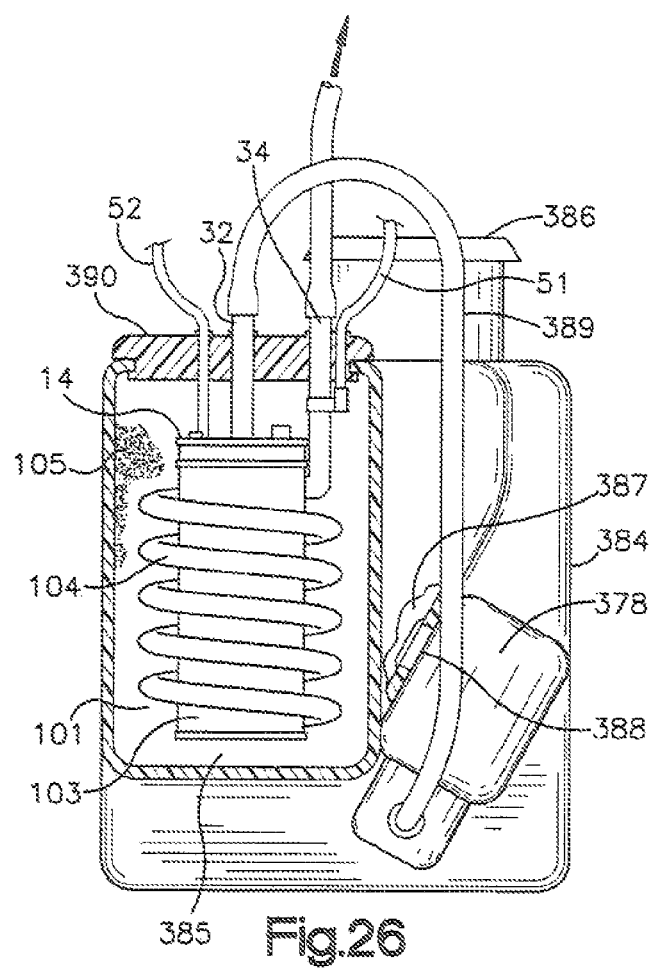
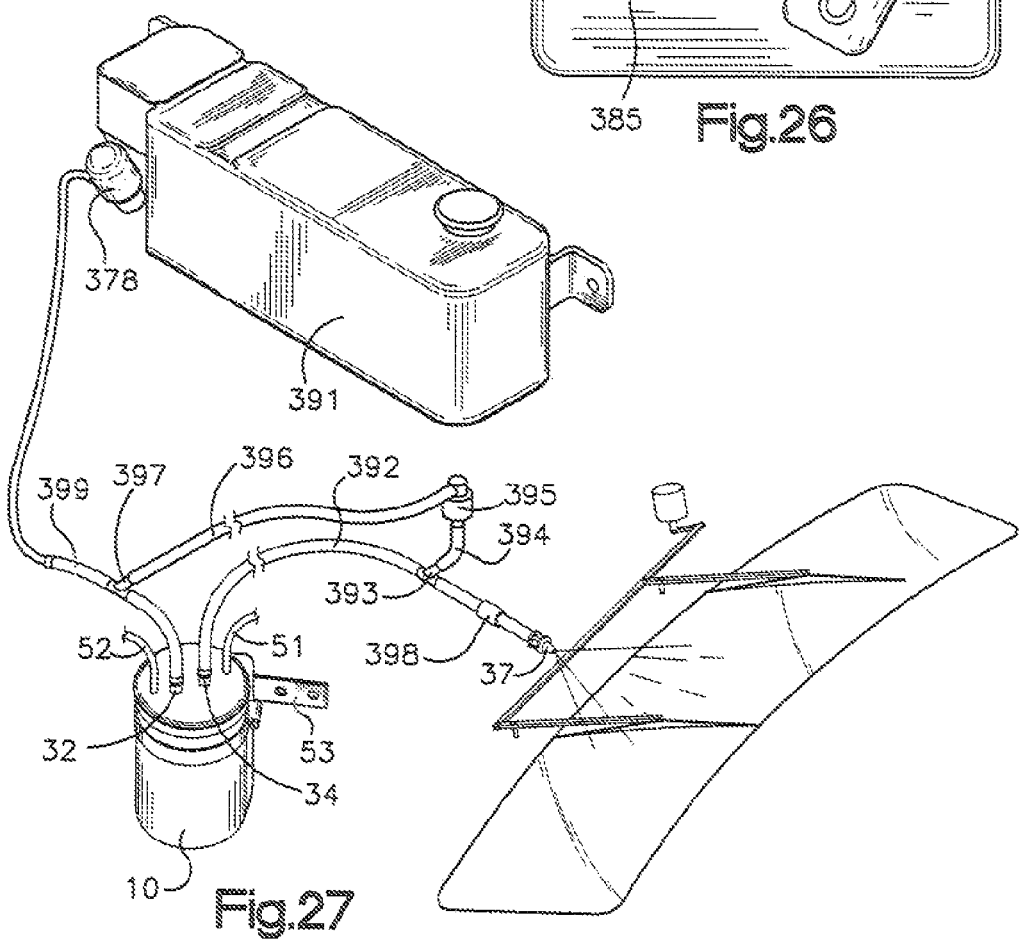

VEHICLE WINDSHIELD CLEANING SYSTEM

RELATE BACK

This application is a divisional application of application Ser. No. 12/182,353 filed on Jul. 30, 2008 which is a divisional application of application Ser. No. 10/894,266 filed on Jul. 19, 2004, now U.S. Pat. No. 7,641,131, which is a continuation in part of co-pending application Ser. No. 10/653,827, filed Sep. 3, 2003 which is a continuation-in-part of application Ser. No. 10/269,647, filed on Oct. 11, 2002, entitled Vehicle Windshield Cleaning System, which claims priority from provisional application Ser. No. 60/415,552, filed on Oct. 2, 2002. This application also claims priority from provisional application Ser. No. 60/551,171, filed on Mar. 9, 2004. All such prior applications are incorporated herein by reference in their entirety.

FIELD OF THE INVENTION

The present invention concerns a windshield cleaning system, and more particularly to a windshield cleaning system that heats cleaning fluid applied to the windshield.

BACKGROUND ART

U.S. Pat. No. 6,364,010 entitled "Device to Provide Heated Washer Fluid" to Richman et al. concerns an apparatus and method for improving the cleaning and deicing effectiveness of a washer fluid in a motor vehicle before spraying it against a windshield, headlamps, etc, and utilizes the heat from the engine coolant to elevate the temperature of the washer fluid. U.S. Pat. Nos. 5,957,384 and 6,032,324 also concern de-icing of a windshield.

SUMMARY OF THE INVENTION

The invention concerns apparatus and method for providing a heated cleaning fluid to a vehicle surface. A system constructed with an exemplary embodiment of the invention has an inlet port for receiving an amount of fluid; an outlet port for dispensing an amount of heated fluid; a heating element that heats up fluid passing from the inlet to the outlet; and a control circuit for energizing at least a portion of the heating element with a voltage to heat the fluid passing from the inlet to the outlet. In one embodiment, the apparatus includes an inlet port, a fluid reservoir, an outlet port, and a control circuit. The inlet port receives cleaning fluid from a cleaning fluid supply, such as a windshield wiper fluid tank. The reservoir is in communication with the inlet port for storing fluid. The reservoir includes an expandable portion that expands when fluid in the reservoir freezes to prevent damage to the reservoir. The outlet port is in fluid communication with the reservoir for dispensing the cleaning fluid. The control circuit controls the dispensing of the fluid from the outlet port.

In one embodiment, the apparatus comprises an inlet port, a heating element through which fluid from the inlet port flows, an outlet port, and a control circuit. The control circuit energizes the heating element with a voltage to heat the heating element and the fluid passing from the inlet, through the heating element, to the outlet. In one version of this embodiment, the heating element is made from stainless steel.

In one embodiment, the apparatus comprises an inlet port, an outlet port, a heating element, a temperature sensor, and a control circuit. The heating element heats fluid that passes from the inlet to the outlet. The temperature sensor is coupled directly to the heating element. The control circuit energizes the heating element with a voltage to heat the heating element and the fluid passing from the inlet to the outlet. In one version of this embodiment, the control circuit selectively energizes and de-energizes the heating element based on input from the temperature sensor to prevent the fluid from reaching a boiling point of the fluid. For example, the control circuit may prevent the fluid from being heated to temperatures above 150 degrees Fahrenheit.

In accordance with an additional embodiment, a fluid bottle provides a walled chamber that acts as a reserve for fluid. A heating coil fits into the walled chamber of the fluid bottle and an electronics module provides power through electrical connections coupled to different portions of the heater coil. A pump pumps fluid through the heating coil within the fluid bottle to a bottle outlet and a conduit routes fluid from the bottle outlet to a dispensing nozzle for delivery of heated fluid against a surface.

These and other objects advantages and features of the invention will become better understood from the following detailed description of one exemplary embodiment of the present invention which is described in conjunction with the accompanying drawings.

BRIEF DESCRIPTION OF THE DRAWINGS

FIG. 2 is a perspective view of an embodiment of the invention showing a heating assembly without an outside housing;

FIG. 3 is a perspective view of the FIG. 2 embodiment of the invention with a housing in place;

FIG. 16 depicts a profile view of an alternative embodiment of the invention where a heater element is integrated into a fluid bottle on a motor vehicle;

FIGS. 16A and 16B are alternate depictions showing positions of a pump and a check value;

FIG. 17 is a top view of a typical vehicle fluid bottle 353, depicting locations for electronics module 356 and a chamber cover 357;

FIG. 18 is a projected front view with a cross-sectioned area showing heater coil positioned inside a walled chamber;

FIG. 23 depicts a profile view of a presently preferred embodiment where a heater element is integrated into a fluid bottle on a motor vehicle;

FIG. 23A shows the structure of FIG. 23 including a bleed hole for allowing fluid to drain back into the fluid chamber;

FIG. 24 is a top view of vehicle fluid bottle 375, depicting the location for a pump on an outer wall of a first chamber;

FIG. 25 is a projected front view with a cross-sectioned area showing heater coil positioned inside a chamber;

FIG. 26 is a side view of another embodiment where a heating element is integrated into a fluid bottle of a motor vehicle;

FIG. 27 is a schematic depiction of a vehicle system with a long fluid flow path to a spray nozzle location;

EXEMPLARY EMBODIMENT FOR PRACTICING THE INVENTION

Figure 1:
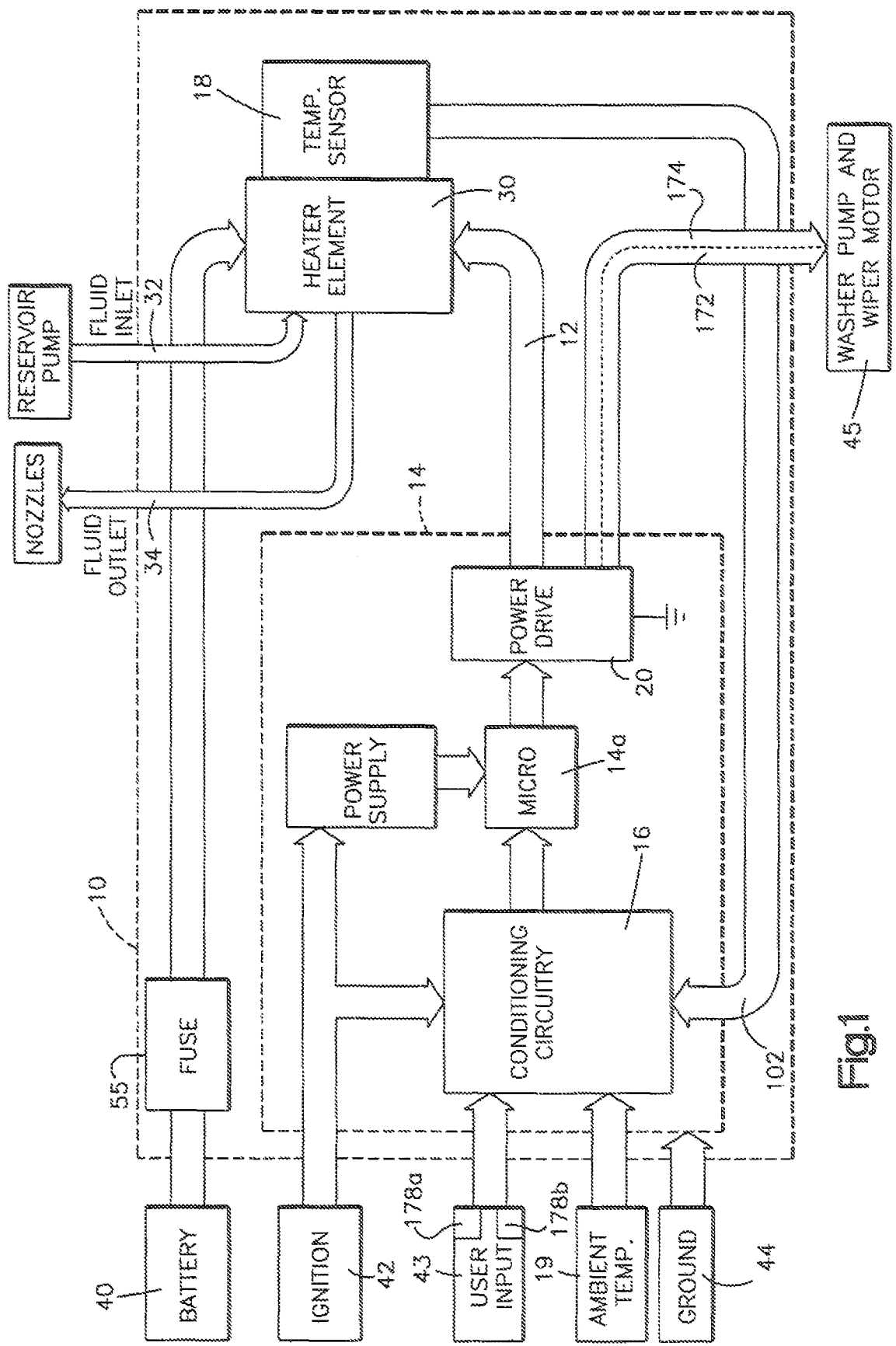
FIG. 1 is a block diagram schematic of a representative system for use with the present invention.

The drawings depict embodiments of the present invention that concern a washer control system 10 for use with a vehicle. In the disclosed exemplary embodiments of the invention, the control system 10 is used in conjunction with a windshield washer apparatus. The control system 10 includes a control circuit 14 that includes an electronic output drive signal circuit 20 and an input signal interpretation or conditioning circuit 16.

The input signal interpretation circuit 16 electronically interfaces with at least one temperature sensor 18. In one embodiment of the invention, the temperature sensor provides output signals related to the temperature of the washer fluid supplied to windshield spray nozzles on the vehicle. In one embodiment of the invention, the control system also includes an electronic output circuit that drives output power control for at least one heating element 30 that applies heat to the windshield washer fluid. The illustrated module output is a "low side" type drive, meaning the module activates and deactivates the heater element by controlling the electrical circuit path to ground. In accordance with an alternate control system, an electronic output coupled to a vehicular communication bus makes available data for system diagnostics. An alternate control system could have an output drive that is a "high side" type. Another alternate control system could have both "high side" and "low side" type drives working together as illustrated in FIG. 1a.

The exemplary control circuit 14 includes a programmable controller 14a that implements control algorithms for washer heater control output functions in response to vehicle input signals.

Figure 1A:
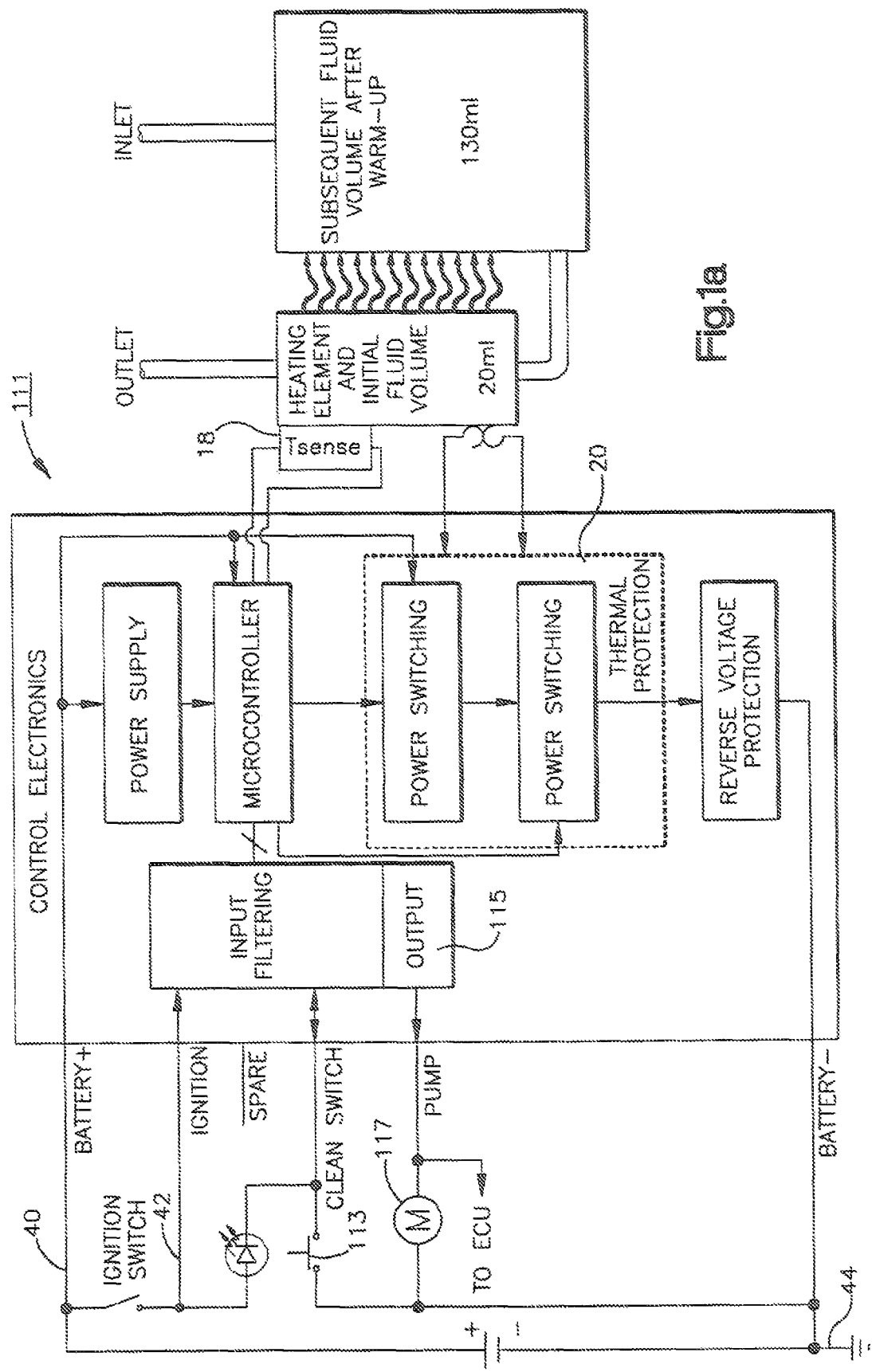
FIG. 1a is an alternate block diagram schematic of a representative system for use with the present invention.

As seen in the functional schematic of FIG. 1, the control system 10 includes an electronic output 12 from the control circuit 14 for providing controlled current to the heating element 30. The control circuit 14 also includes an input signal interpretation circuit 16, or interface, to monitor input signals from, as one example, the temperature sensor 18. The temperature sensor 18 provides signals that allow for control of the amount of power delivered to the heating element 30. The controller monitors inputs from a vehicle battery 40 and vehicle ignition 42. In accordance with an alternate embodiment, the controller also monitors ambient temperature by means of the temperature sensor 19. In accordance with another alternate embodiment as illustrated in functional schematic of FIG. 1a, the controller also monitors a user input and drives the vehicle washer fluid pump. Furthermore, the controller provides output signals for controlling the heater element 30.

The exemplary control system also includes an electronic output circuit 20 to control power coupled to at least one heater element 30. In the exemplary embodiment, the heater element 30 heats windshield washer fluid as the fluid passes through the heating element 30. A heating element that windshield washer fluid flows through, rather than a heating element that is submersed in the washer fluid, minimizes the formation and/or size of mineral deposits that could potentially clog application nozzles 37. The illustrated heating element 30 includes a length of stainless steel tubing with electrical connections 60, 62 (FIG. 2) electrically coupled to ends of the tubing. The use of a stainless steel heating element, instead of a heating element made from another material such as aluminum, also minimizes the formation of nozzle clogging mineral deposits. For example, an aluminum reservoir exposed to an air pocket or dissolved oxygen might be susceptible to oxidation. After the aluminum oxides form to some depth, the washer fluid could act to break off the aluminum oxide. The aluminum oxide particles could flow to the nozzle, causing a clog. Agitation during movement of the vehicle would also cause pieces of the aluminum oxide to break off and flow to the nozzle 37.

As seen in the Figures the system has an inlet 32 and an outlet 34. The inlet receives washer fluid from a fluid reservoir 35 (FIG. 7) of a motor vehicle and the outlet 34 delivers heated washer fluid to nozzles 37 mounted to the vehicle which direct the washer fluid against the vehicle surface, typically a windshield, lamp etc. The heating element 30 can be constructed from other metals such as brass and the like having electrical resistivity properties such that they sufficiently resist current flow to generate the required heat. In FIG. 2 a stainless steel tube is shown coiled to reduce the overall size of the heating system. Alternative embodiments could have the heater element in other bent or un-bent shapes such as serpentine or straight tube configurations. The heating element of FIG. 2 has an uncoiled length of approximately 4 to 5 feet and is constructed of 5/16 inch diameter stainless steel tubing. When coiled to the configuration shown in FIG. 2 the coiled heating element has an inside diameter of 1 and 11/16 inch.

Figure 6:
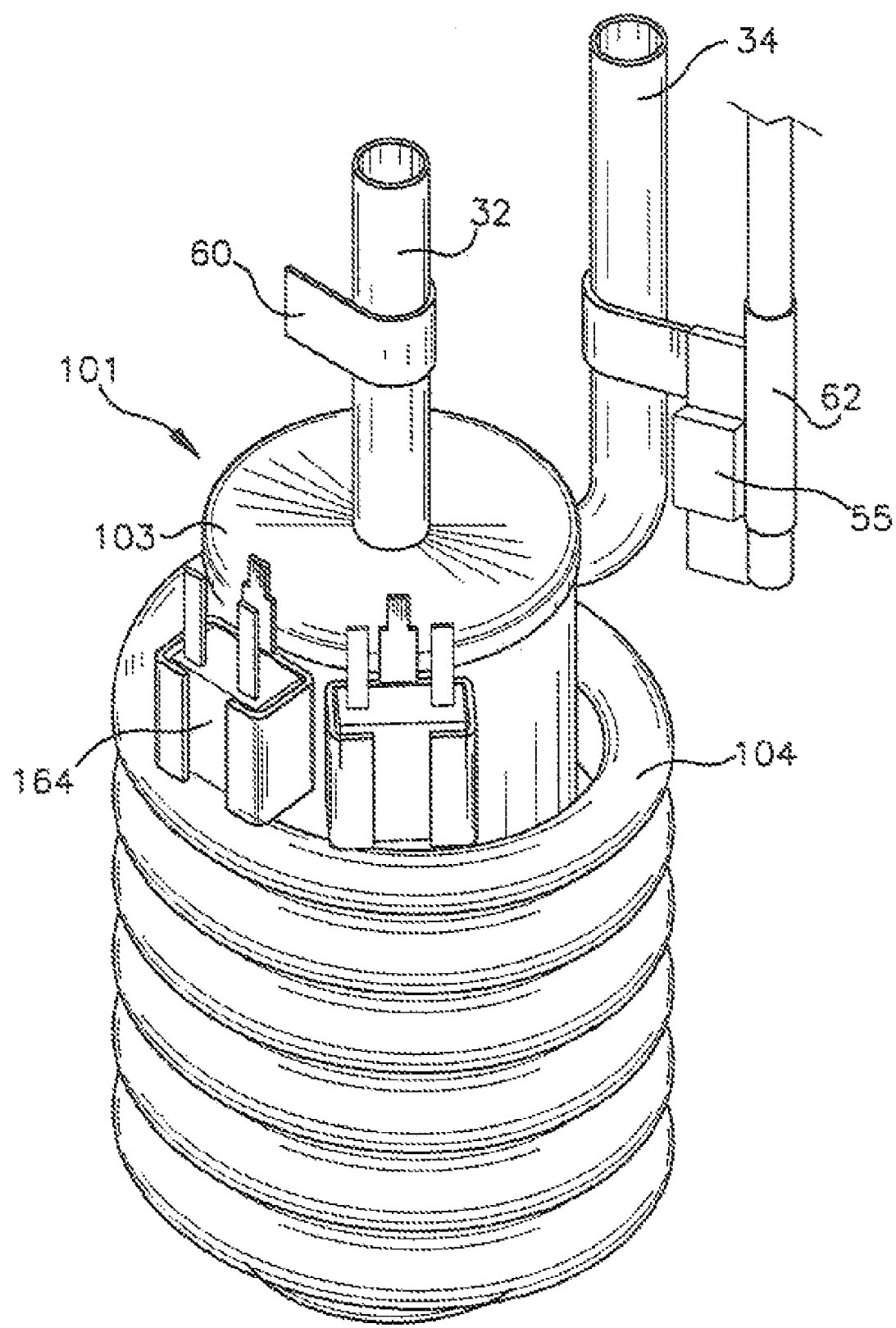
FIG. 6 is a perspective view of an alternative heating element from the heating element depicted in FIG. 2.
Figure 7:
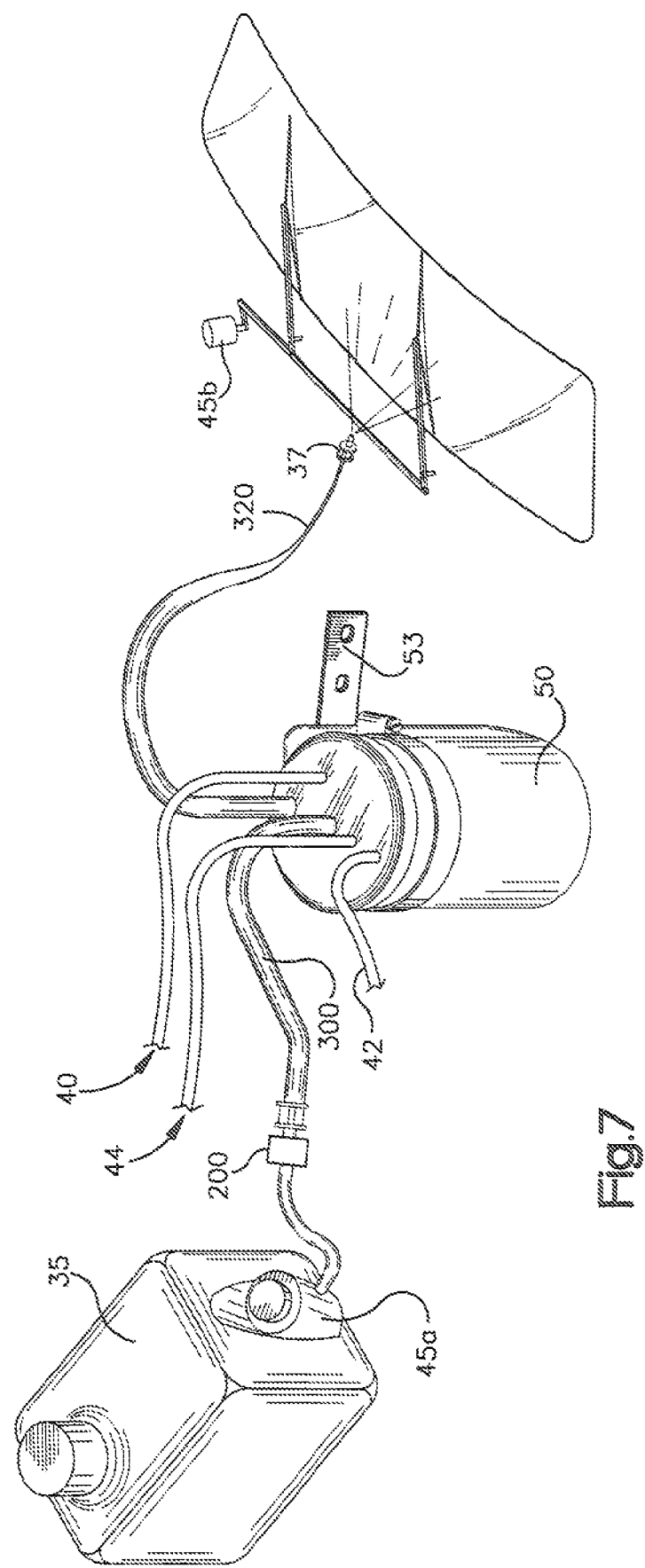
FIG. 7 is a perspective view of a heating assembly coupled to a fluid pump.

FIGS. 6-7 depict another embodiment of a heating element 101 made up of a central reservoir 103 and a serially connected coiled heater tube 104. A fluid tight engagement between the reservoir 103 and the coiled heater tube is accomplished by coupling the tube and the reservoir by silver soldering or welding. Fluid is routed from vehicle reservoir 35 through flexible tubing 300 into the central reservoir 103 by means of an electrically conductive coupling. In one embodiment, a central reservoir 103 is constructed from a length of copper tubing and has an outer diameter of approximately 1½ inches. Alternately, the central reservoir could be constructed from brass, stainless steel or other electrically conductive materials. In a presently preferred embodiment, the central reservoir is constructed from stainless steel. It is realized that the more resistive the material, the more resistance heating will occur, adding to the heating of fluid in the central reservoir. For example, a stainless steel central reservoir is more resistive and would provide more heating. The coiled heater tube 104 is constructed of stainless steel having a 5/16 inch diameter. The smaller diameter tube 104 is connected to an outlet 34 that routes heated fluid to nozzles or the like. This outer tube is coiled to an inside diameter of 1 and 11/16 inches.

In the illustrated embodiment, an energizing signal is applied to the ends of the series connected central reservoir 103 and heater tube 104 so that current passes through both the reservoir 103 and the tube 104. When the coiled heater tube 104 is made from stainless steel and the central reservoir 103 is made from copper, the stainless steel coiled heater tube 104 has a higher resistivity than the copper central reservoir 103 and therefore heats to a higher temperature more quickly. In this example, the inner larger diameter reservoir is heated by some resistance heating but mainly by conduction heating from the coil. The reservoir 103 and heater tube 104 in this embodiment are thermally coupled by an encapsulant 105 (see FIG. 8) within the housing to provide better heating of the reservoir 103 by the heater tube 104. Both elements in this embodiment are surrounded by insulation within the housing 50. A preferred encapsulant is S7252 commercially available from Epic Resins.

Figure 9:
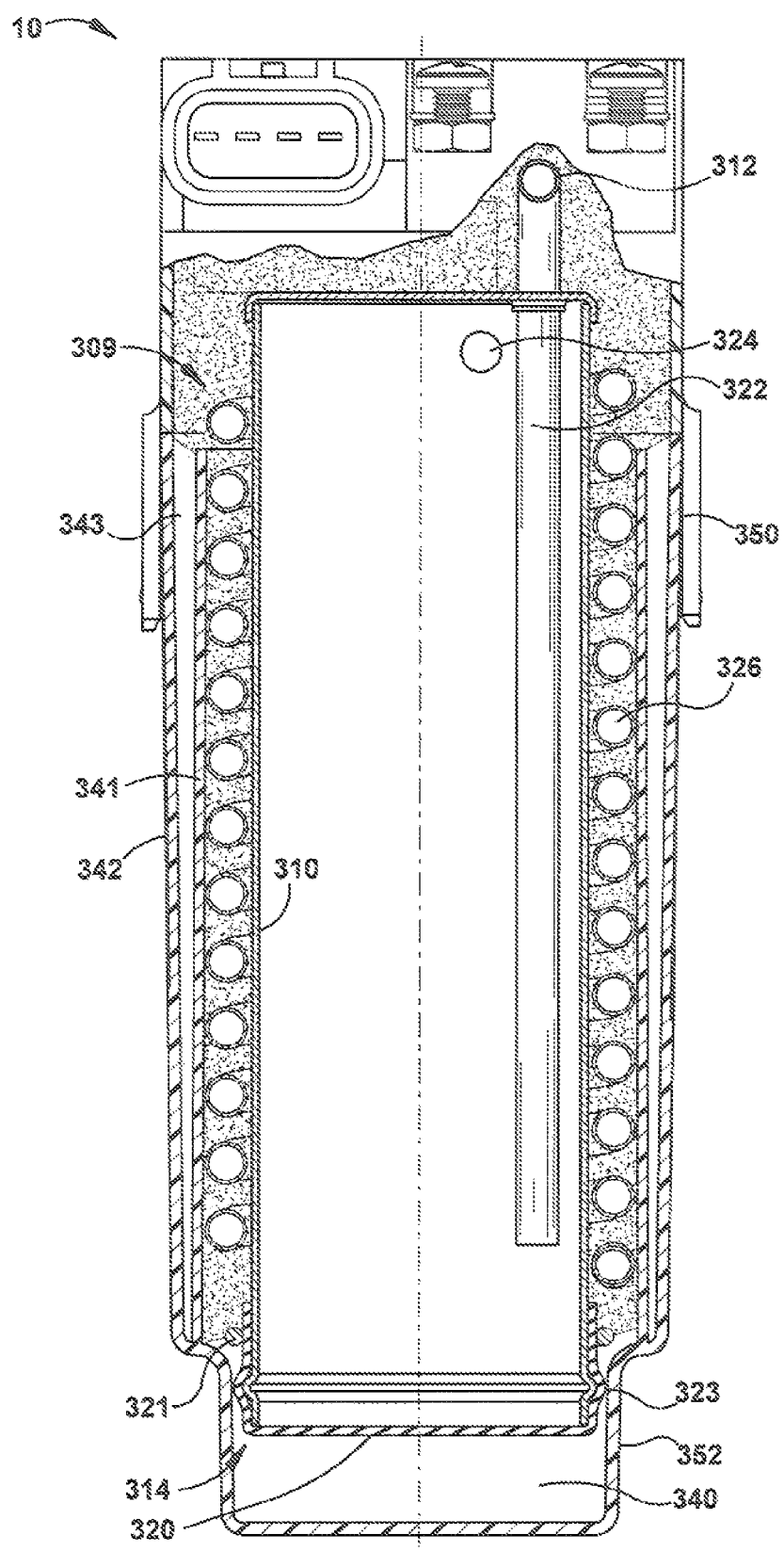
FIG. 9 is a sectional view of a heating assembly including the heating element illustrated by FIG. 6 and a freeze expansion feature.
Figure 10:
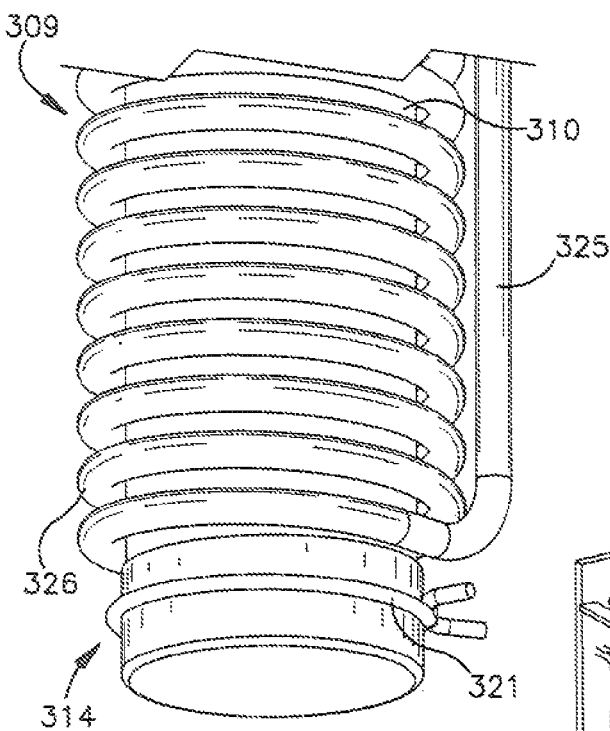
FIG. 10 is a perspective view of a heating assembly including the heating element illustrated by FIG. 6, and a freeze expansion feature including a freeze expansion boot and a freeze expansion boot clamp.

FIGS. 9 and 10 depict a presently preferred embodiment of control system 10 with heating element 309. A reservoir 310 is in fluid communication with the inlet port 312 for storing a reserve of fluid. The reservoir 310 employs an expandable portion 314 at the bottom to protect the reservoir 310 from damage in the event that water freezes in the reservoir. The expandable portion is made from a thermoplastic rubber boot 320 that covers an open end of the reservoir 310. One suitable boot is constructed from Santoprene 201-55 available from Advanced Elastomer Systems, 388 S. Main St., Akron, Ohio 44311. It is held in place by a circumferentially extending clamp 321 similar to a hose clamp. A outwardly extending lip of 323 of the reservoir impedes slippage of the clamp and securely holds the boot in place.

Figure 5:
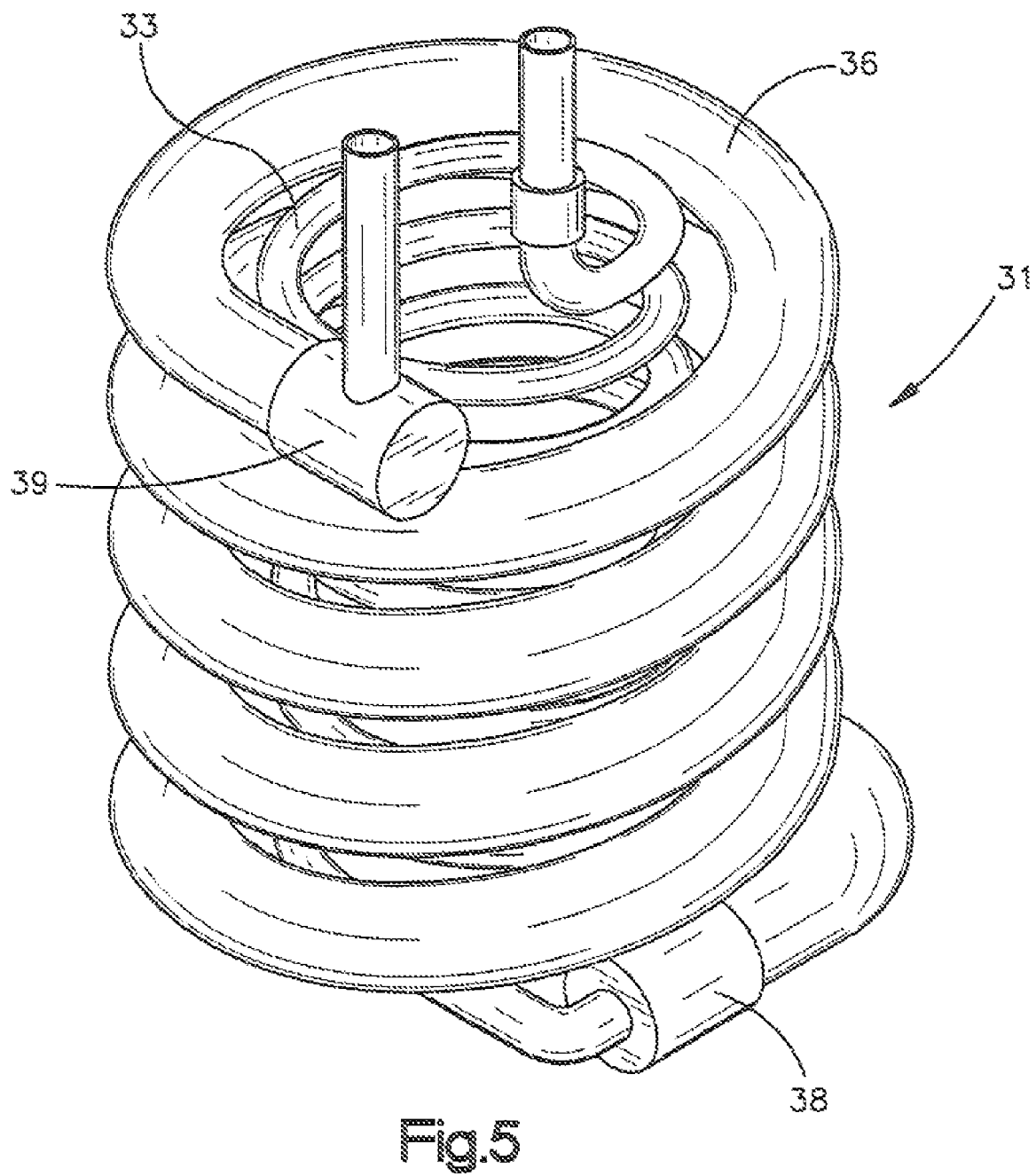
FIG. 5 is a perspective view of an alternative heating element from the heating element depicted in FIG. 2.

Referring to FIG. 3, all four of the embodiments of the heating elements 30, 31, 101, 309 are packaged in a housing that is located in the engine compartment of the vehicle. Flanges 52 extend from sides of the housing 50 to allow the housing to be attached to a wall of the vehicle engine compartment in one embodiment. FIG. 7 shows an alternate attachment method using a band clamp 53 with a mounting tab. FIG. 2 represents one of the embodiments of the disclosed invention shown in FIG. 3 without the housing 50. Now referring to FIG. 2, the electrical connections 60 and 62 are shown on the ends of the given length of heating element 30. Similar connections are coupled to the ends of the series connected tubes of FIG. 5, the series connected reservoir 103 and tube 104 of FIG. 6, and the series connected reservoir 310 and tube 322 of FIG. 11. In accordance with one embodiment of the invention, as fluid passes through the heating element tube, the fluid is heated according to the amount of power applied to the tube, the fluid flow rate, and ambient temperature. The programmable controller 14 constructed in accordance with the exemplary embodiment of the invention also implements control algorithms for washer heater control output functions in response to vehicle input signals. As washer fluid temperature changes due to ambient temperature changes, battery voltage changes. As such, the amount of applied heat is increased or decreased in order to maintain a washer fluid at or near a target temperature.

Controller Schematics

Figure 4:
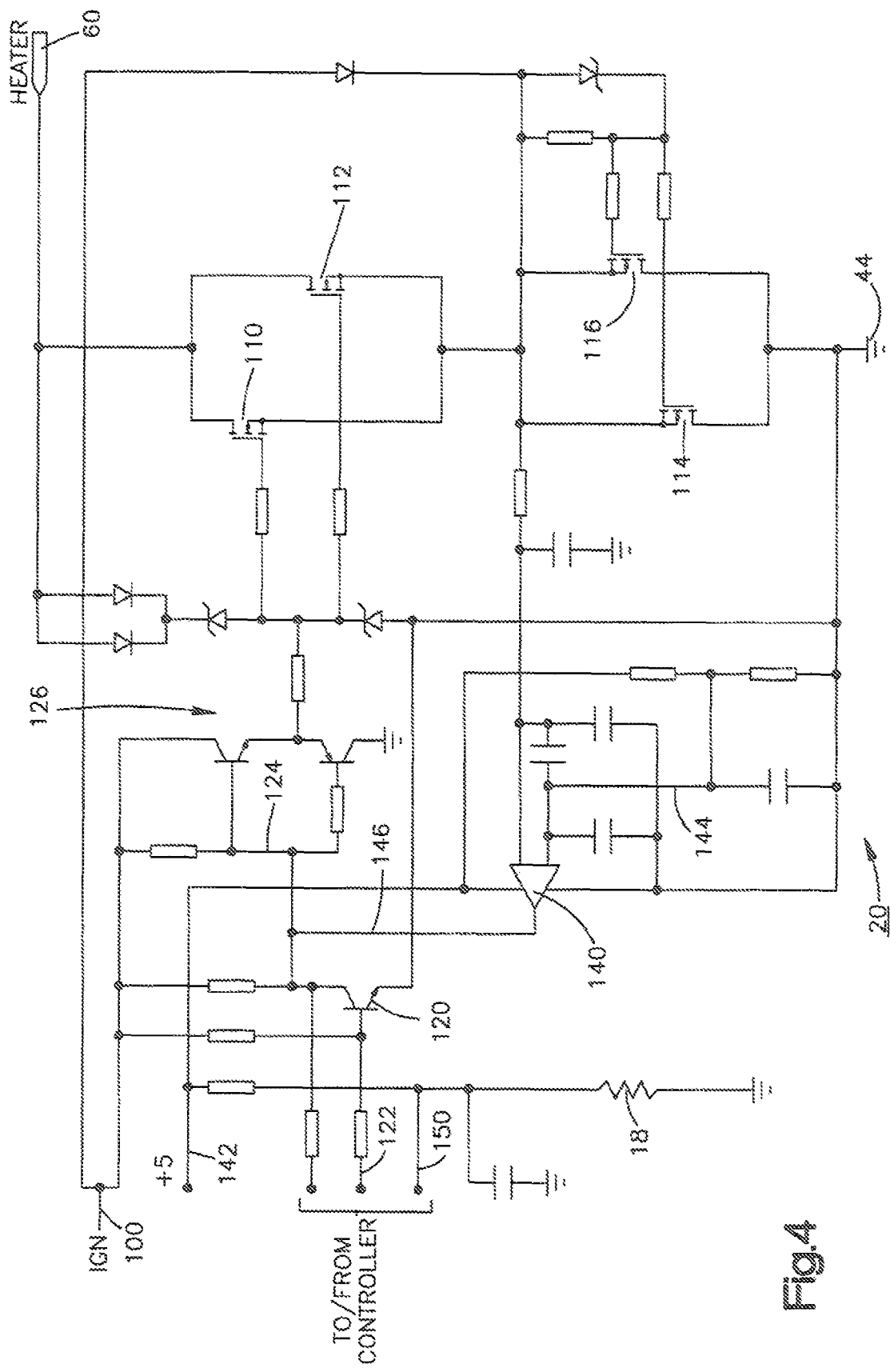
FIG. 4 is a schematic diagram of a drive circuit coupled to a fluid heating element that forms part of the FIG. 2 heating assembly.

The system block diagram shown in FIG. 1 and the more detailed schematic of FIG. 4 depict operation of the control system 10. FIGS. 1 and 7 illustrate the external electrical connections, which include Battery 40, Ground 44, and Ignition 42. Alternate system block diagram 111 shown in FIG. 1a shows further external electrical connections including an a user operated Clean Switch 113 and an output 115 to drive a vehicle washer pump motor 117. The Battery input connection 40 provides the voltage supply needed by the control system 10. This connection allows the high current flow required by the heating element. The Ground connection 44 provides the current return path to the battery negative terminal. This ground connection allows the high current flow required by the heating element plus the requirement of the control system 10. A fuse 55 (FIG. 6) is located in series with the battery connection and the heater element. An Ignition input 42 provides power to the controller. The battery voltage is monitored by the controller 14 to determine if there is sufficient voltage present to allow the control system to operate.

An input 102 from the temperature sensor 18 in physical contact with the heating element 30 is directly related to washer fluid temperature. Washer fluid temperature is monitored by using a temperature sensor such as a thermistor, RTD, or the like. The washer fluid is monitored non-invasively by attaching the temperature sensor to the stainless steel tube of the heater. The temperature of the tube corresponds to the temperature of the fluid within the tube. Alternatively, the fluid temperature could be monitored invasively by placing a temperature sensor directly into the fluid through a threaded fitting or other suitable attachment method.

Operation

The controller receives a wake-up command signal from the Ignition input 100. When the Ignition input is above a predetermined voltage, the controller 14 drives the heater element 30, the series connected tubes of the heater 31 or the reservoir and tube of the heater 101 low if the following are true:

1. The ignition voltage is greater than a first predetermined level and less than a second predetermined level.
2. The sensed Heater element temperature is less than a predetermined level.

An output driver 20 depicted in FIG. 1 and FIG. 1a apply power to the heater after starting the heating cycle. The output driver will then begin applying power to the heater at a rate of one hundred cycles per second by means of a pulse width modulated (PWM) output as to maintain the temperature of the fluid. The fuse 55 is located between the battery connection and the heater element external to the housing 50 in the illustrated embodiment as shown in FIG. 6. An alternative embodiment could have the fuse internal to the housing as shown in FIG. 1. In the exemplary embodiment of the invention, the desired heater temperature is predetermined to be in a range between 120 and 150 degrees Fahrenheit. Placing the temperature sensor 18 in physical contact with the heating element and maintaining the heater temperature at a temperature at or below 150 degrees Fahrenheit prevents the heating element from heating the cleaning fluid to an undesirable temperature, such as boiling. This prevents the formation of mineral deposits that could potentially clog the nozzle 37. If the temperature sensor is not mounted directly on the heating element, but is rather located in the fluid reservoir, only an approximate, latent measurement of the heating element temperature is sensed. This would allow the heating element to heat to a temperature that is hotter than the desired fluid temperature and potentially cause the formation of nozzle clogging mineral deposits. The output driver 20 will remain active as long as the ignition voltage is above a predetermined voltage and the heater temperature is below the desired heater temperature as determined by the temperature sensor 18. When the ignition is turned off, the controller is deactivated.

Turning now to FIG. 4, the output circuit 20 is depicted in greater detail. A heater connection 60 is shown in the upper right hand portion of the FIG. 4 depiction. This connection is grounded by means of initiating conduction of two power Field Effect Transistors (FET) 110, 112 which provide a current path to ground from the heater connection 60 to the ground connection 44 through a pair of reverse polarity protection FET transistors 114, 116. The two transistors 110, 112 are turned on or rendered conductive by means of a pre-drive transistor 120 that is coupled to an output 122 from the microprocessor controller 14a. First consider a high output from the controller 14a at this output 122. This turns on transistor 120 that pulls an input 124 of a totem pole transistor combination 126 low. This signal turns on a lower of the two transistors of the totem pole combination to send activation signal that turns off the two FETs 110, 112.

When the controller provides a low output from the controller 14a at the output 122, the transistor 120 turns off and pulls an input 124 to a totem pole transistor combination 126 high. This signal turns on an uppermost of the two transistors of the totem pole combination to send an activation signal that turns on the two FETs 110, 112.

In one embodiment, a comparator 140 monitors current through the transistors 114, 116 (and by inference the transistors 110,112) and deactivates the transistors in the event too high a current is sensed. A five volt signal that is supplied at an input 142 from a power supply (FIG. 1) provides a reference input 144 to the comparator 140. When the non-reference input exceeds the reference input due to a rise in the current through the transistors 110, 112 (and associated rise in the voltage across the transistors 114, 116) the output 146 of the comparator goes low and removes the input from the gate of the FETs 110, 112 that causes them to conduct. This low signal at the output 146 is also coupled to the controller so that the controller can respond to the over current condition.

In accordance with the exemplary embodiment of the invention a thermistor temperature sensor 18 is also coupled to the controller. A signal at a junction between the temperature sensor 18 and a resistor coupled to the five volt input 142 generates a signal at an input 150 related to the temperature of the heater 30.

Referring to FIG. 2, preferred control circuit 14 is mounted to a printed circuit board 160 supported by a cover 50a of the housing. As seen in FIG. 2, the illustrated connector 60 is a bent metallic member that attaches to the heating element 30 in the vicinity of the printed circuit board 160 and is in physical contact with the circuit components on the printed circuit board. The connector 60 thereby not only acts as a path to ground for current passing through the heating element 30 but acts as a heat sink that transmits heat away from the printed circuit board to the tube of the heating element 30 in the region of the inlet where the reservoir pump 45a routes cleaning fluid into the tube. Once the connections to the heating element have been completed, the housing 50 is attached to the cover 50a and a foam core material (not illustrated) is placed into the housing. The material acts as an insulator to impede heat loss from the outer surface of the heating element.

The exemplary control circuit includes a microcontroller running at an internal clock frequency of 4.0 Megahertz. In the exemplary embodiment, the microcontroller 14a selectively energizes the heating element based on a voltage applied to the control circuit. This voltage may be the battery voltage and/or the ignition voltage. When the ignition input voltage goes high, the control circuit will power up, come out of reset, and wait for a start delay time imposed by the controller to allow the vehicle's electrical system to become stable. After this start delay, the control circuit monitors the ignition voltage to determine if the ignition is above a minimum enable voltage. A temperature signal from the sensor 18 is also monitored to see if the temperature of the fluid is below a set point temperature. The output drive feedback signal is also monitored to ensure that the output is in the correct state. If all conditions are such that the output can be enabled, the output 122 to the transistor 120 is pulled low. This initiates fluid heating. Initially, the output drive is on 100% for a maximum on time or until the feedback temperature reading approaches a set point temperature. In the exemplary embodiment, the preset maximum on time is empirically derived to stay below the boiling point of the cleaning fluid. Subsequently the control will read the heating tube temperature and make a determination if power should be reapplied to the tube. If the sensed temperature is below the desired setpoint, the output will be re-enabled at a variable duty cycle so that the tube is heated to the setpoint goal temperature as quickly as possible without exceeding a maximum allowable overshoot temperature.

Normal operation consists of maintaining the fluid temperature at the desired setpoint temperature by varying the duty cycle at which voltage is applied across the tube. The output duty cycle changes based on how far the sensed temperature is below the set point temperature.

In the event of excessive current flow through the output, the output will automatically be disabled. In this event the signal at the output 146 from the comparator will go low. When this occurs the controller 14a disables the output to the transistor for a period of time equal to an output retry rate programmed into the controller 14a. If the fault condition is removed, normal operation of the temperature set point control is re-instituted. An alternate embodiment could have the current sense capability omitted.

In the event the operating voltage from the battery (and ignition) is too high or too low (16.5 and 8 volts respectively) the controller 14a disables the output for a timeout period. After the timeout period, if voltage conditions are within normal parameters, the controller again enables the output. The exemplary system also incorporates a soft turn-on and turn-off of the heating element. The soft turn-on and turn-off is accomplished by a slow ramp up or down of the PWM signal from the microprocessor 14a that drives the heating element. The ramping of power reduces the amount of flickering that can be observed from the headlights. It is recognized that the FET drivers could be run linearly (instead of pulse width modulated) to accomplish the soft turn-on and turn-off of the heating element. It is also recognized that the FET drivers could be run linearly to regulate the temperature of the heating element. It is further recognized that if the FET drivers are run linearly they will produce quantities of heat that will aid in the heating of fluid in the system.

Figure 11:
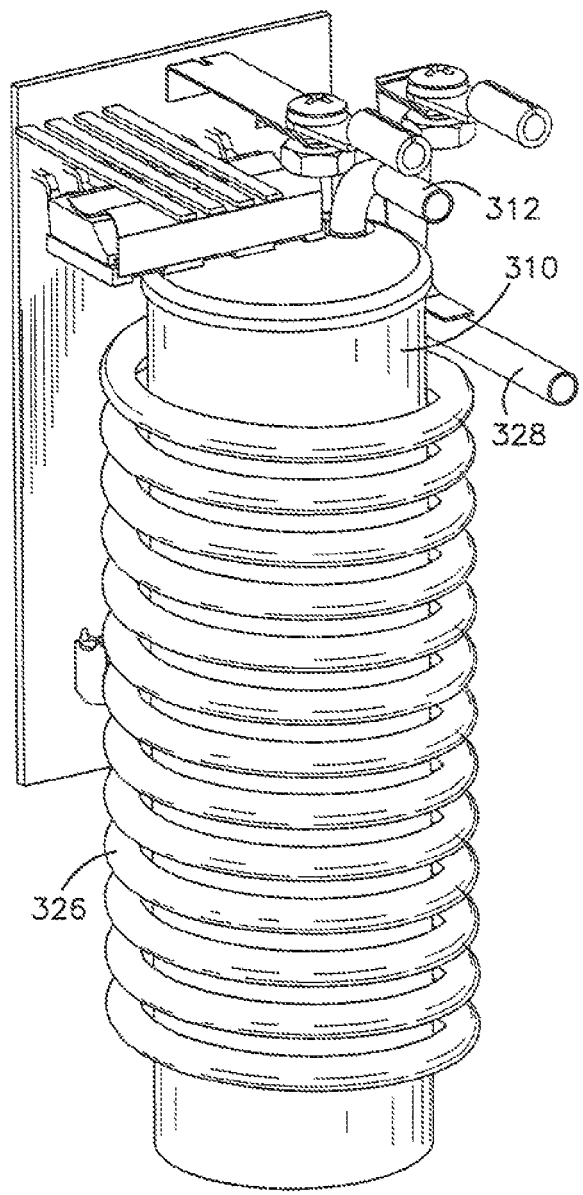
FIG. 11 is a perspective view of top portion of the heating assembly of FIG. 10.
Figure 12:
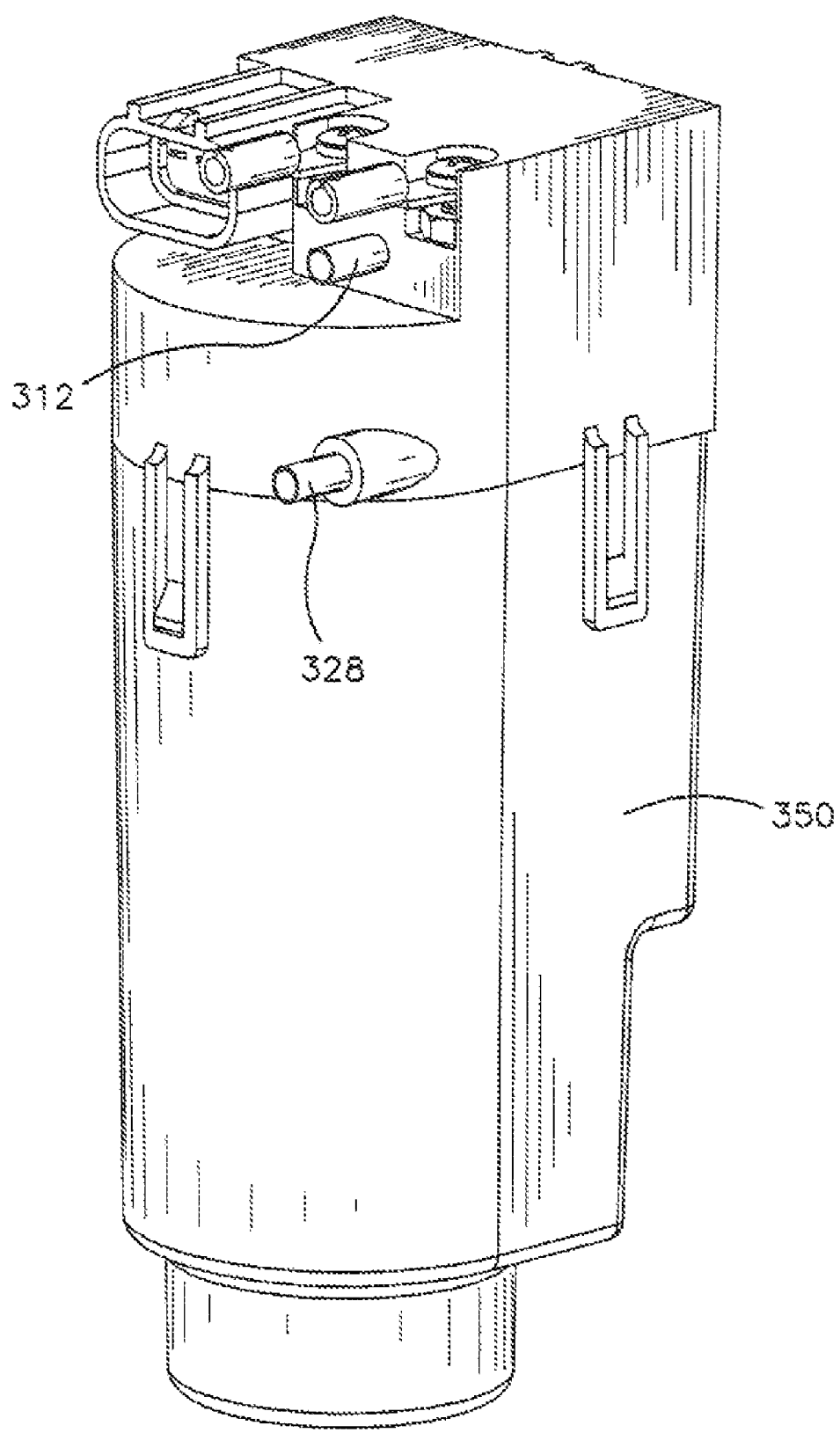
FIG. 12 is a perspective view of a heating assembly housing.
Figure 15:
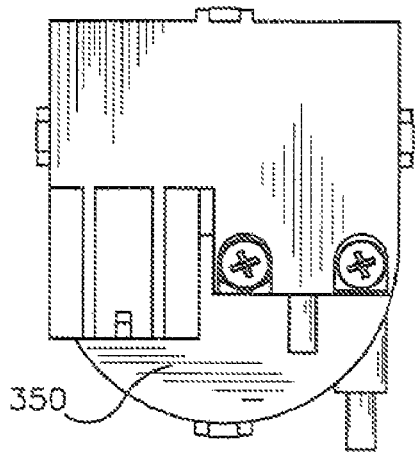
FIG. 15 is a top plan view of the heating assembly housing of FIG. 12.
Figure 13:
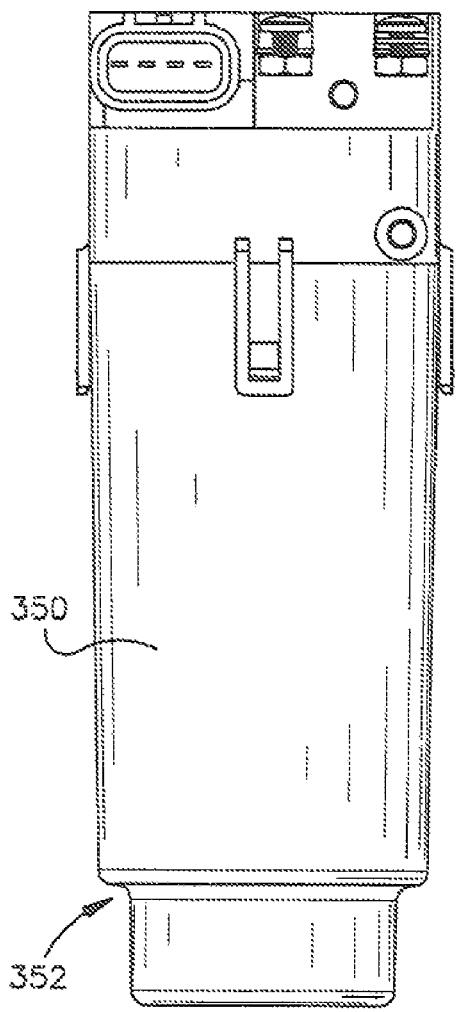
FIG. 13 is a front elevation view of the heating assembly housing of FIG. 12.
Figure 14:
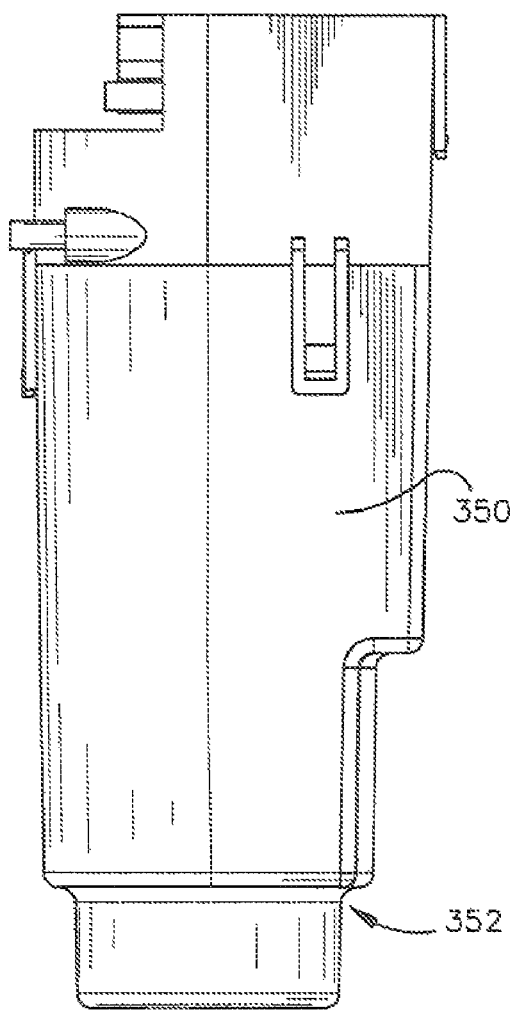
FIG. 14 is a side elevation view of the heating assembly housing of FIG. 12.

Turning to FIGS. 9-11, the presently preferred embodiment includes a tube 322 that extends from the inlet port 312 through a length of the reservoir 310 to route unheated cleaning fluid, for example cold water, to the bottom of the reservoir. As the cleaning fluid heats inside the reservoir it tends to rise. The cleaning fluid in the reservoir exits an exit port 324 at the top of the reservoir passes through a tube 325 along an outer surface of the reservoir and then spirals up through the coiled outer heater tube 326 to an exit port 328 (See FIG. 11).

As also depicted in FIG. 9 a plastic housing 350 of the presently preferred embodiment has a stepped bottom portion 352 that has an open chamber 340 sized to allow the boot 320 to expand outwardly into the chamber. The housing 350 is a molded plastic and includes inner and outer walls 341, 342 that define an air gap 343 between the walls. During construction of the assembly 10, a potting compound is added to the housing interior and fills the region between coils of the heating tube 326. The potting compound does not fill the air gap, however and this air gap tends to insulate the tube and reservoir.

Alternative Embodiments

Additional features of the invention adapted for use with a motor vehicle can be realized as described below. These embodiments have the same electrical configuration and operate in the same manner as the preferred embodiment.

One alternative embodiment of the invention uses a communications interface to transmit ambient temperature, battery voltage, washer switch activation status, washer pump use, engine running information, and other such information to the controller. Likewise, the controller could transmit task commands to the vehicle such as start wipers, pump washer fluid, controller status, and the like.

An alternate embodiment could include electronic input and/or output circuitry to interface with at least one ambient air temperature sensor 19 that provides output signals related to a sensed state of ambient air temperature.

Another embodiment of the invention could use engine coolant to heat the washer fluid prior to flowing through the heating element. This will reduce the amount of power required to heat the fluid to predetermined temperature using the heating element.

Figure 8:
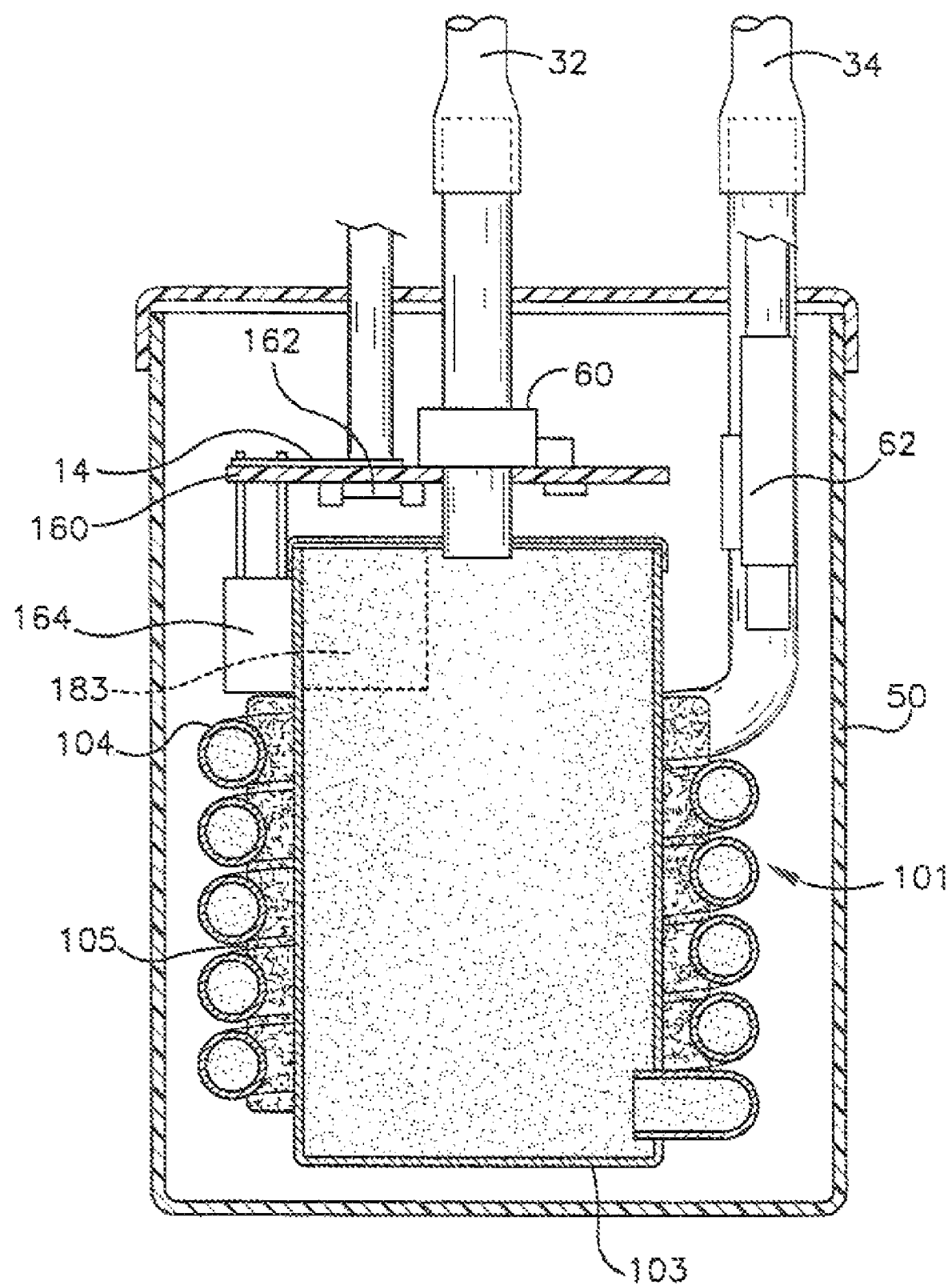
FIG. 8 is a sectional view of a heating assembly including the heating element illustrated by FIG. 6.

In the embodiment illustrated by FIGS. 6 and 8, the control circuit is disposed on a circuit board 160 positioned adjacent to the heating element 101, promoting heat transfer between the control circuit 14 and the heating element 101. A thermal fuse 162 on the printed circuit board 160 is in close proximity to the heating element. In the event that the heating element temperature surpassed a predetermined threshold, the fuse would open and disable the output drive. The control circuit 14 illustrated in FIGS. 6 and 8 includes one or more heat dissipating devices 164 mounted to the printed circuit board. In one embodiment, a heat dissipating device 164 of the control circuit is mounted to a heating element to provide additional heating of the fluid. One such heat dissipating device is a FET that drives the heating element. In the embodiment illustrated by FIG. 6 a heat dissipating device 164 is mounted to the reservoir 103. A heat dissipating device 164 could also be is mounted to a coil of one of the heating elements 30, 31, 101, 309.

Another embodiment of the invention could use a time varying signal from the vehicle alternator to determine if the engine is running. This could be used in conjunction with the ignition input or as a stand-alone signal eliminating ignition input.

Another embodiment of the invention could use the washer pump 45a to regulate the temperature of the washer fluid. In this embodiment the system would control the washer pump 45a as well as the heating element. When the controller receives a request for washer use, the output driver would activate, heating the fluid with the heating element. When the washer fluid was at temperature the washer pump would be enabled. After the volume of heated fluid was used the pump would be disabled, and the fluid would again start heating to a predetermined level. After the fluid achieves the desired temperature level the pump would again be activated.

In one embodiment, the control circuit 14 includes an output 172 that controls the washer pump 45a and separate output 174 that controls the wiper motor 45b. This allows the control circuit to disable the wiper motor 45b for a predetermined period of time after energizing the heating element and/or applying the heated fluid. For example, the control circuit could disable the wiper motor during the first heat cycle after initialization. This would allow for the heated fluid to have a more significant impact on surface contamination such as frost before the wipers are activated.

Another embodiment would have a separate user input devices 178a, 178b for independent control of the washer pump 45a and the wiper motor 45b respectively. The user could then spray heated fluid on the windshield as required for cleaning independent of wiper action which tends to force heated fluid from the windshield and thins the remaining liquid film causing more rapid cooling of the liquid that is left on the windshield.

Another embodiment would have an auxiliary heating element on the inner copper reservoir 103. This would allow for more direct heating of the fluid contained in the reservoir as compared to the conduction heating of the fluid by the outer coil through the encapsulant material. This would also allow for the outer coil to be disabled when the system has been in a mode of operation that only sustains the temperature of the fluid. This would allow for a lower power heat source to be enabled over longer periods of time, compared to the high power very short duration pulses that are applied to the main heater coil. Decreasing the high current requirements would decrease the wear on the vehicle's electrical system. It is further realized that auxiliary heating could come from the FET transistors that drive the heating element. It is further realized that the auxiliary heating could come from a patterned heater such as a thermofoil heater or electro-thermal conductive flexible graphite, also known as vermiform graphite, such as those available from Minco Products, Inc., 7300 Commerce Lane, Minneapolis, Minn. 55432-3177 U.S.A. or EGC Enterprises Inc., 140 Parker Court, Chardon, Ohio 44024.

Similarly, another embodiment would have an auxiliary heating element 183 in the inner reservoir. This would allow for more direct heating of the fluid contained in the reservoir as compared to the conduction heating of the fluid by the outer coil through the encapsulant material. This would also allow the outer coil to be disabled when the system has been in a mode of operation that only sustains the temperature of the fluid. This would allow a lower power heat source to be enabled over longer periods, compared to the high power, very short duration pulses that are applied to the main heater coil. Reducing the high current requirements would decrease the wear on the vehicle's electrical system.

Another embodiment would have two different heat modes, the first having a higher power, the second a lower power. The two modes of operation could be used based on ambient temperature conditions. If, for example, it were below 40 degrees Fahrenheit where frost could be present on a vehicle windshield, the unit would use high power mode to heat fluid quickly to aid the operator in its removal. Alternately, if ambient temperature were say 40 degrees Fahrenheit or greater, a lower power mode would be used. This would allow for heating of fluid to aid in the cleaning of the windshield, but at a slower heating rate. This would decrease wear on the vehicle's electrical system when fast heating times are not required. The lower power is achieved by having a lower duty cycle on the heater drive. It is understood that the decision to switch from a power level to another power level could be accomplished with an external jumper or switch. This would provide the user with means for controlling the power applied to the heater. It is also understood that the external switch or jumper could cause the selection of other functions or characteristics.

Another embodiment could have a multiplicity of reservoir tanks connected in series or parallel combination. This would give increased available volume of heated fluid. Alternately, instead of having multiple reservoir tanks connected in one unit, multiple units could be connected together forming a system. Another alternate configuration would be the invention in conjunction with windshields that have self-heating capabilities, such as those with a translucent oxide coating enabling electrical current to flow from one end of the glass to the other creating heat due to the resistance of the coating.

Another embodiment could use a flow switch 200 to determine when to heat the fluid. The control would activate the output driver when flow is detected so that the fluid is heated only when there is a demand. It is understood that the flow switch could be a magnet and reed switch combination, or a magnet and a Hall Effect sensor, or a paddle wheel type, and the such.

An alternative embodiment could use two fluid temperature sensors, one at the heater element inlet and the other at the heater element outlet. When the heater is in operation and fluid is flowing, there should be a temperature differential across the heater element. That is, a fluid of a given temperature goes into the heater element, and warmed fluid exits the heater element. If the control used the washer motor voltage as an input to initiate a heating cycle, the two fluid temperature sensors could be used to determine that fluid flow exists. If there is a temperature differential, there would be flow. If there were a minimal or negligible temperature differential, a zero or low flow condition would be indicated. In the event of a low or zero flow condition, the heating element would be de-energized.

Another embodiment could have a diagnostic output that could be used for evaluating system performance and for diagnosing system faults. Operational parameters will be sent via communications such as serial communications using a proprietary bus or other standard bus protocol. A computer could be connected to the module using an appropriate interface cable to allow for reading and interpreting data. In addition to reading data for diagnostics, the invention could include communications and interface means to allow for programming of the microcontroller after the assembly of the device is complete. This would allow for software upgrades on units that have finished the manufacturing process.

Another embodiment could include control of the windshield wiper motor and washer pump. A separate switch input 43 (FIGS. 1 and 1a) would activate a cycle to dispense the fluid.

Another embodiment could include control of the windshield wiper motor and washer pump. A switch input would activate an automatic cycle to dispense the fluid.

Another embodiment could include control of the windshield wiper motor and washer pump. A signal could be sent to an existing engine control module (ECM) to initiate a washer and/or wiper sequence of operation.

In another embodiment, the module would control delayed wiper functions and would also have a switch input for one-touch control of the wiper motor and washer pump for spraying of washer fluid in an automatic wash cycle with an automatic wash cycle consisting of a given number of washer pump cycles and given number of wiper motor excursions. It is understood that cycle counts and motor excursions could be substituted for given times.

FIG. 16 depicts a profile view of an alternative embodiment of the invention where a heater element is integrated into a fluid bottle on a motor vehicle. The fluid bottle 353 is constructed such to provide a walled chamber 354 that heater coil 355 fits into. The walled chamber acts as a reserve for additional fluid, conductively heated by the heater coil 355. The chamber is intended to limit the volume of fluid surrounding the heater element to aid in conserving energy and time to heat the reserve fluid. A fluid displacement cylinder 366 that is made from closed cell foam or any non-electrically conductive material, is positioned closely inside heater coil 355 to further limit the amount of fluid to be conductively heated. Heater coil 355 could also be coated with a non-thermally conductive material for thermal isolation to provide faster initial fluid heat response. The coating material could be elastic PVC, or any material with poor thermal conductivity capable of being thinly applied, such as by dipping, to contoured surfaces. An electronics module 356 is mounted external to the fluid bottle 353, with sealed connections passing from heater coil 355 through a chamber cover 357. Electronics module 356 receives user inputs through harness and connector 364 and provides outputs to connectors coupled to opposite ends of the coil 355. Fluid bottle 353 is filled through a filler neck 358, and enters into a first chamber 365. Fluid enters into the second chamber 354 through passage 359. A pump 360 draws fluid into heater coil 355 through inlet 361, where it is heated before exiting through an outlet tube 362 into pump 360. Heated fluid is routed to the dispense nozzles through tube 363 onto the vehicle windshield, headlamps, etc. System air lock can be avoided by positioning pump 360 above the highest coil on the heater coil 355, as shown in FIG. 16a. A check valve 428 could also be used between pump 360 and heater coil 355 to prevent fluid from trying to re-enter heater coil 355 from the region of the dispense nozzle, as shown in FIG. 16b. To avoid system air lock with second chamber 354 as fluid is dispensed into it, a vent hole 431 could be added to chamber cover 357, or into wall 432 as shown in FIG. 16b.

FIG. 17 is a top view of a typical vehicle fluid bottle 353, depicting locations for electronics module 356 and a chamber cover 357. FIG. 18 is a projected front view with a cross-sectioned area showing heater coil 355 positioned inside walled chamber 354 of a dual chambered fluid bottle 353. A well known construction method for a dual chambered fluid bottle 353 made from materials such as polypropylene or high density polyethylene (HDPE) is hot plate welding two injection molded bottle halves together. The larger unheated volume of fluid is contained in first chamber 365 of the fluid bottle 353, where it flows from the first chamber 365 through a passage 359 into a second chamber 354. Passage 359 is positioned low in fluid bottle 353 to allow a near empty fluid volume to dispense from the chamber 365 into the chamber 354.

Figure 19:
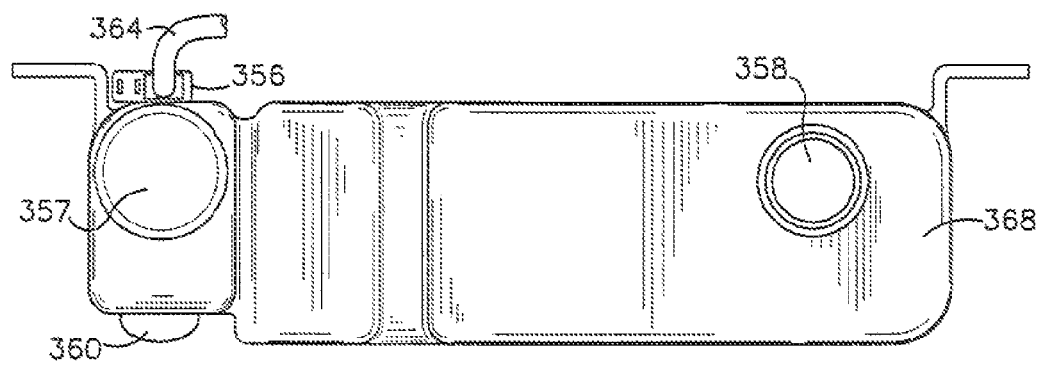
FIG. 19 is a top view of a further embodiment of vehicle fluid bottle.
Figure 20:
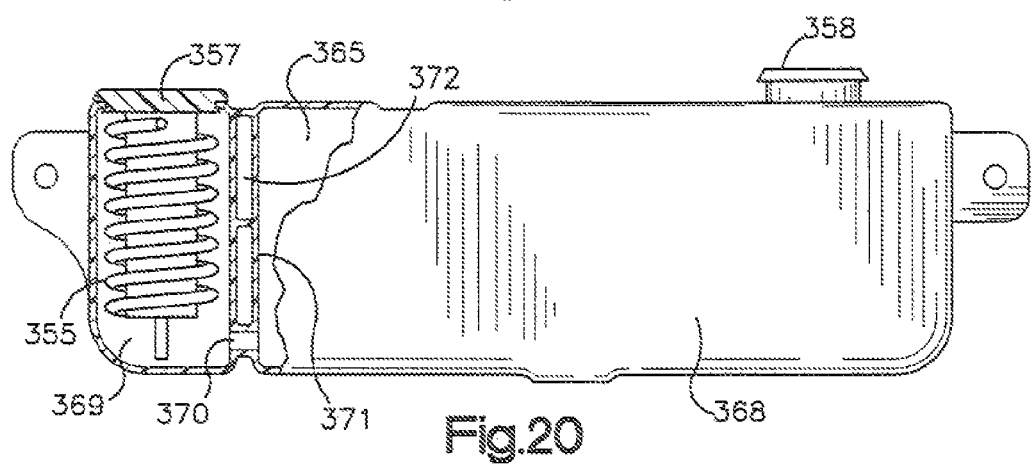
FIG. 20 is a projected front view with a cross-sectioned area showing the heater coil.

FIG. 19 is a top view of a further embodiment of vehicle fluid bottle 368. FIG. 20 is a projected front view with a cross-sectioned area showing the heater coil 355 positioned inside double walled chamber 369 of dual chambered fluid bottle 368. The larger unheated volume of fluid is contained in first chamber 365 of fluid bottle 368, where it flows from the first chamber 365 through a passage 370 into the second chamber 369. The double wall 371 is separated by one or more air cavity features 372, intended to provide insulation between the colder fluid contained in first chamber 365 and the conductively heated fluid contained in second chamber 369, thereby conserving heat loss and energy.

Figure 21:
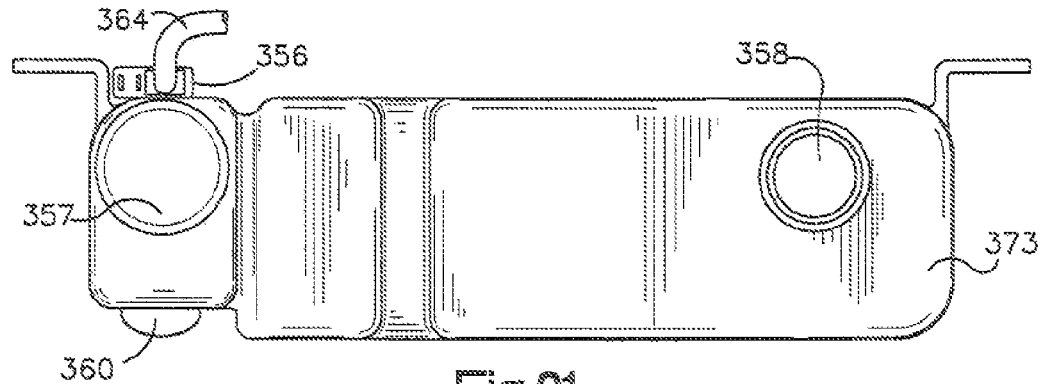
FIG. 21 is a top view of yet a further embodiment of vehicle fluid bottle.
Figure 22:
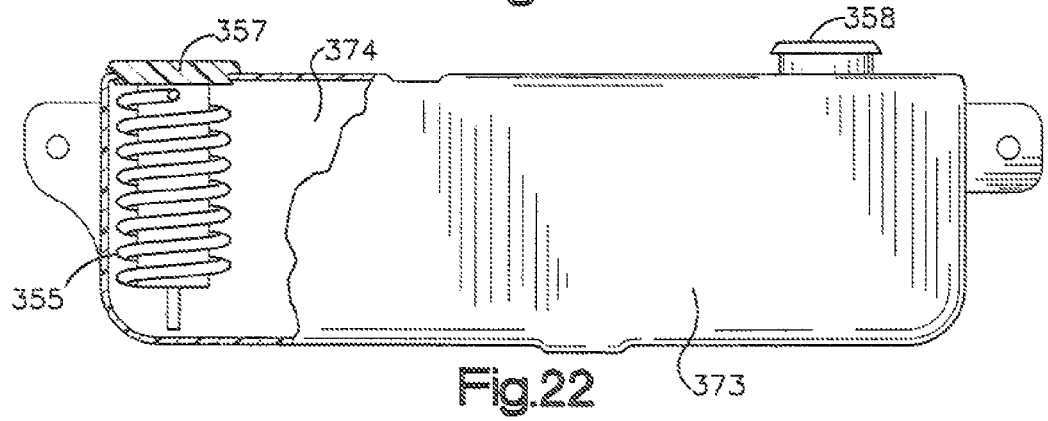
FIG. 22 is a projected front view with a cross-sectioned area showing a heater coil.

FIG. 21 is a top view of yet a further embodiment of vehicle fluid bottle 373. FIG. 22 is a projected front view with a cross-sectioned area showing heater coil 355 positioned inside single chamber 374 of fluid bottle 373. The time and energy required to heat fluid in this configuration is greater than that of FIGS. 17, 18, 19 and 20.

FIG. 23 depicts a profile view of a preferred embodiment where a heater element is integrated into a fluid bottle on a motor vehicle. This configuration is similar to that described in FIG. 16, with added features to address concerns about heated fluid passing through pump 378. The fluid bottle 375 is again constructed such to provide a walled chamber 383 that heater coil 355 fits into. Fluid bottle 375 is filled through filler neck 376, and enters into a first chamber 377. The pump 378 draws fluid from the chamber 377 through first port 382, and dispenses into second chamber 383 through second port 379. Pump 378 is intended to be capable of drawing fluid from the bottom level of the bottle 375 for capability of pumping fluid to a near empty condition. As chamber 383 is pressurized, fluid is forced into heater coil 355 through inlet 361, where it is heated before exiting through tube 381 and routed to the dispense nozzles onto the vehicle windshield, headlamps, etc.

FIG. 24 is a top view of vehicle fluid bottle 375, depicting the location for pump 378 on the outer wall of first chamber 377. This figure shows the fluid path from pump 378 through port 379 into second chamber 383. FIG. 25 is a projected front view with a cross-sectioned area showing heater coil 355 positioned inside chamber 383. This figure also depicts a positioning of pump 378 on the outer wall of first chamber 377. This embodiment could also employ an air insulated double wall between the first and second chambers, as described in FIG. 20.

FIG. 26 is a profile view of another embodiment where a heating element is integrated into a fluid bottle on a motor vehicle. The configuration of heating element 101 is similar to that described in FIG. 8. This configuration also incorporates features described in FIG. 23 addressing concerns about heated fluid passing through the pump 378. The fluid bottle 384 is constructed to provide a walled chamber 385 that heating element 101 fits into. Fluid bottle 384 is filled through filler neck 386, and enters into inlet 32 by means of hose connection 389 from the pump 378. Fluid fills reservoir 103 and is forced into heater tube 104, where it is heated before exiting through outlet 34 and routed to the dispense nozzles onto the vehicle windshield, headlamps, etc. Chamber 385 is filled with encapsulant 105 to provide thermal coupling between heater tube 104 and reservoir 103 for faster heating of the reserve fluid contained within reservoir 103. Also, the mass of encapsulant 105 surrounding reservoir 103 provides residual heating through its thermal properties during periods when heater coil 104 is not being energized. Control circuit 14 is also surrounded by encapsulant 105 in this configuration. Inlet 32, outlet 34, external electrical battery connection 51 and ground connection 52 are all routed through a chamber cover 390, and sealed with encapsulant 105. As in FIG. 23, pump 378 is intended to be capable of drawing fluid from the bottom level of bottle 384 for pumping fluid until a near empty condition is experienced.

FIG. 27 is a schematic depiction of a vehicle system with a generally long fluid path to the spray nozzle locations. Between cycles of user activation, the time heated fluid remains in the fluid line 392 between the outlet 34 of washer control system 10 and spray nozzle(s) 37 can cause the resident fluid to cool. One embodiment of a vehicle washer system using a fluid re-circulation method is shown. "Y" or "T" fitting 393 is connected to fluid line 392 between outlet 34 and nozzle(s) 37. If the heated fluid remains in fluid line 392 a predetermined time between cycles of user activation, control circuit 14 of FIG. 8 would activate a second pump 395 to redirect the fluid through hose connections 394, 396 back to inlet 32 of washer control system 10 by means of "Y" or "T" fitting 397 into hose connection 399. Re-circulated fluid could alternatively be dispensed back into fluid bottle 391 if desired. Pressure sensitive check valve 398 would be used to effectively stop fluid flow ahead of nozzle(s) 37 and limit the dispensing of unwanted cool fluid to a small amount. An alternate method of providing heated fluid is to allow the fluid in the distribution tube to bleed back into the heated reservoir. Referring to FIG. 34, in the event that the vehicle has been off for an amount of time that allows the fluid in the distribution tube to cool to ambient temperature, a method is desirable to have only heated fluid spray on the windshield and not the cooled fluid. Bleed hole 450 in heater coil 355 allows fluid from the nozzles to the heater to drain back into chamber 383. Upon reactivation of system with vehicle start the fluid in chamber 383 and heater coil 355 will be heated to a desired temperature. When fluid use is desired fluid will be pumped into the distribution tube and dispensed through nozzles 37.

Figure 29:
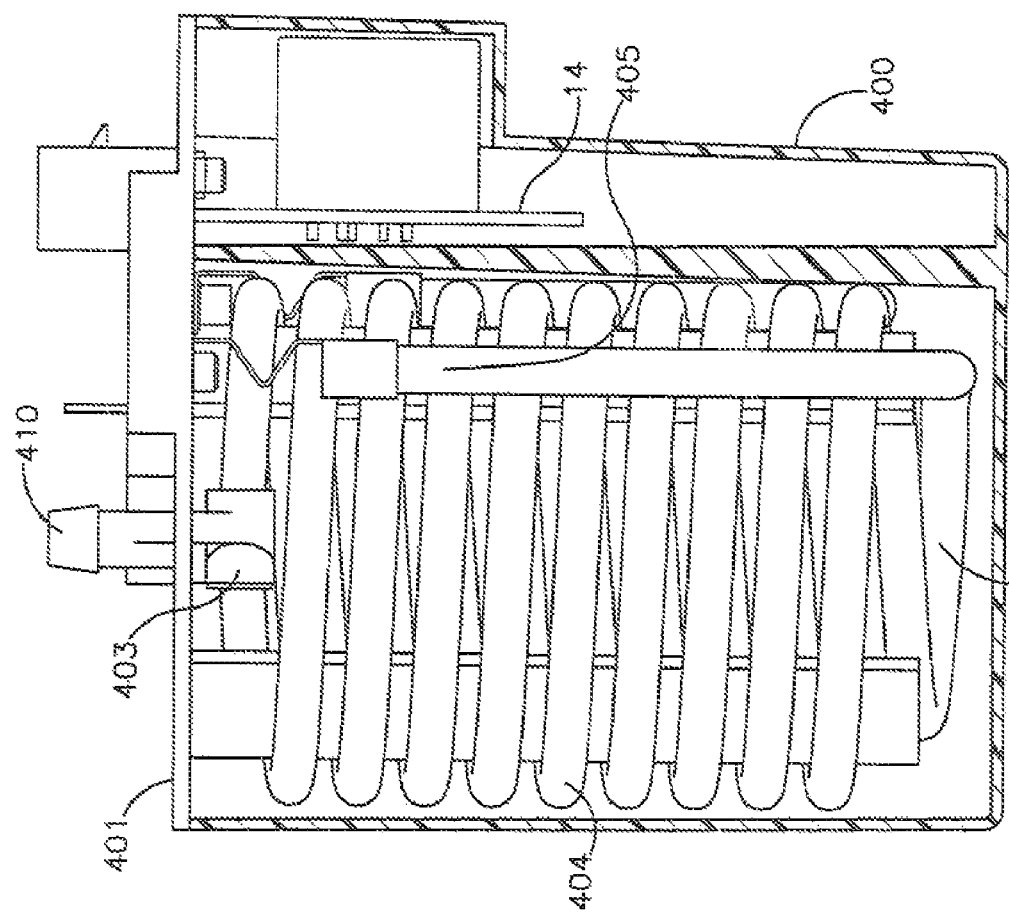
FIGS. 29 and 30 are front and back elevation views of the FIG. 28 embodiment of a washer control system that addresses concerns about excessive fluid pressure drop caused by flow through a continuous heater coil.
Figure 28:
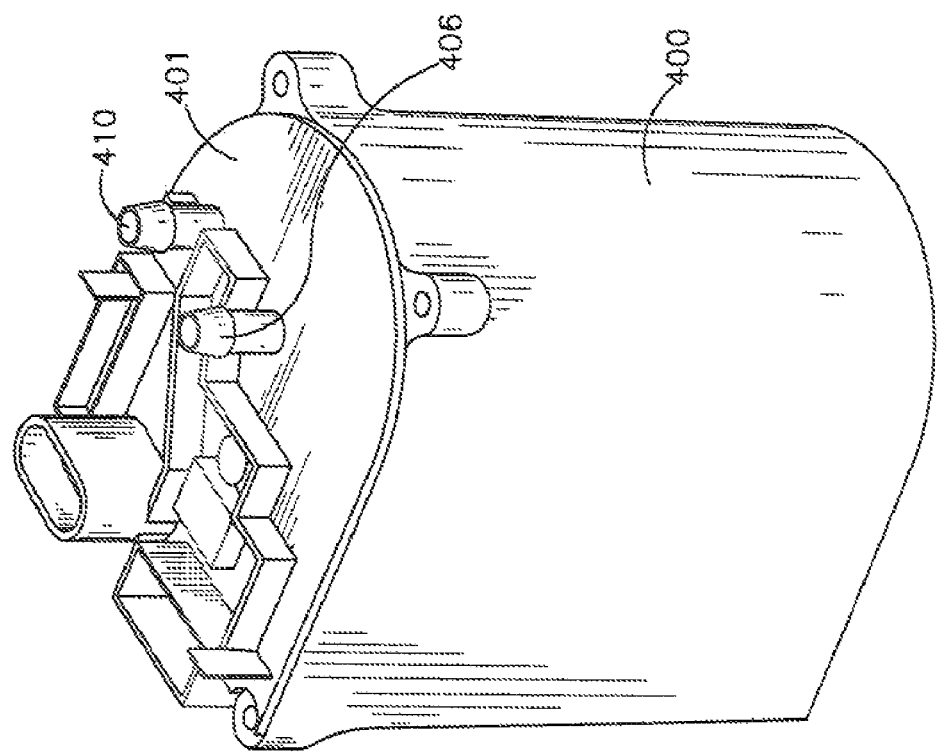
FIG. 28 is a perspective view of another embodiment of a washer control system.
Figure 31:
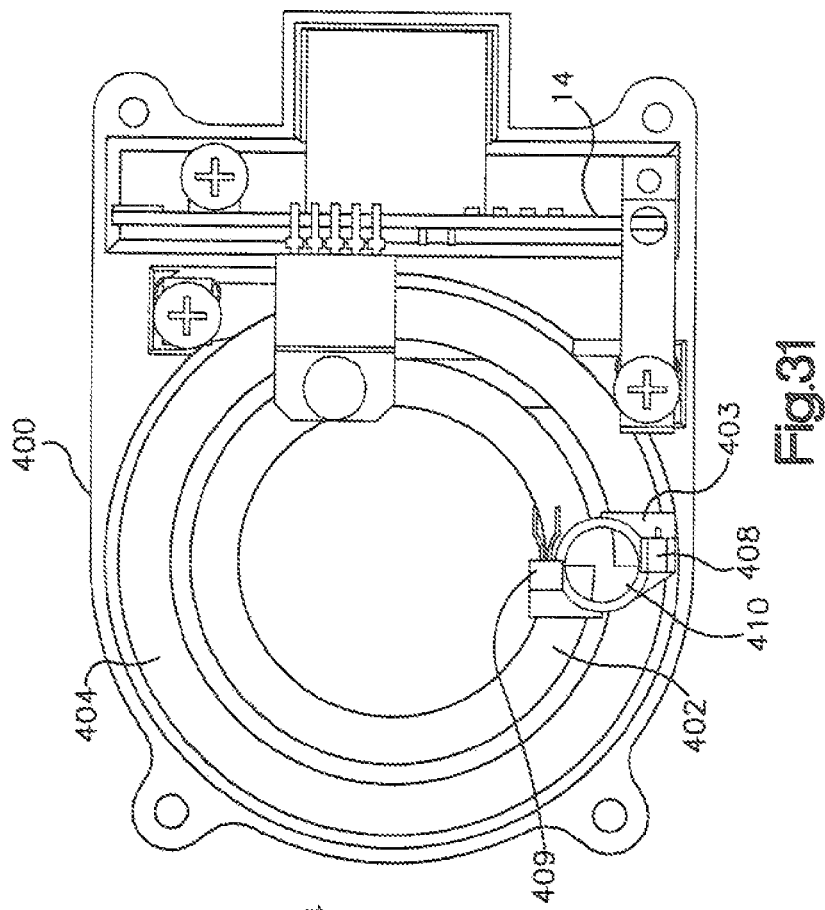
FIG. 31 is a top plan view of the washer control system of FIG. 28 with a top cover removed.
Figure 30:
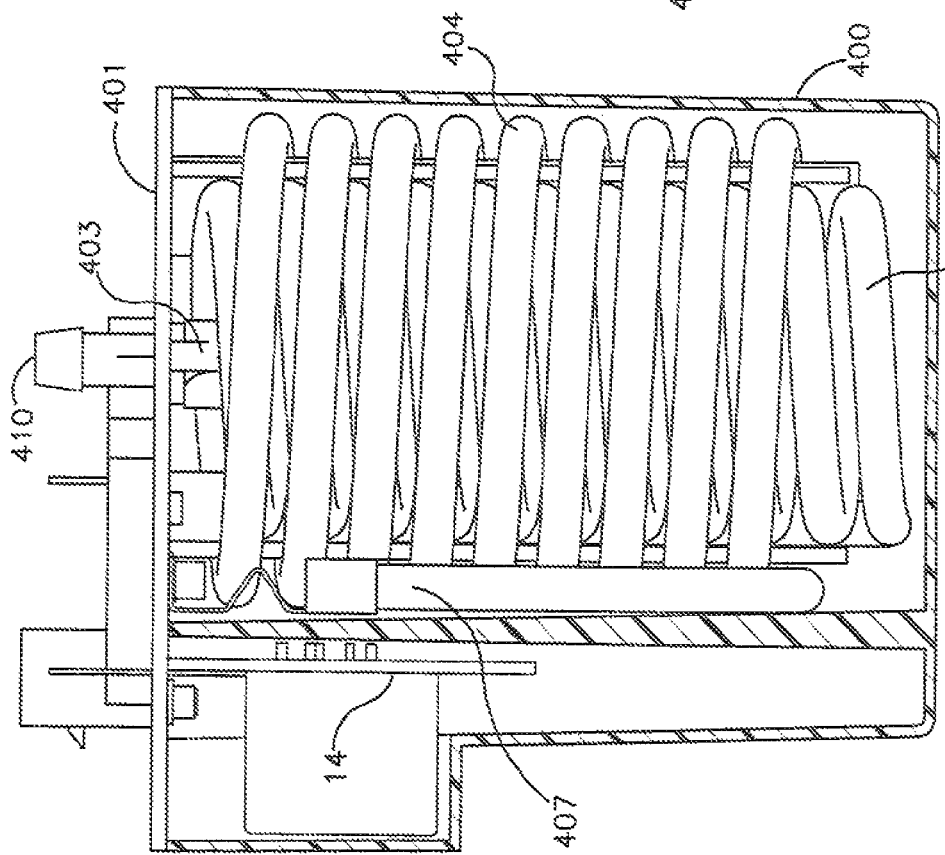
Figure 33:
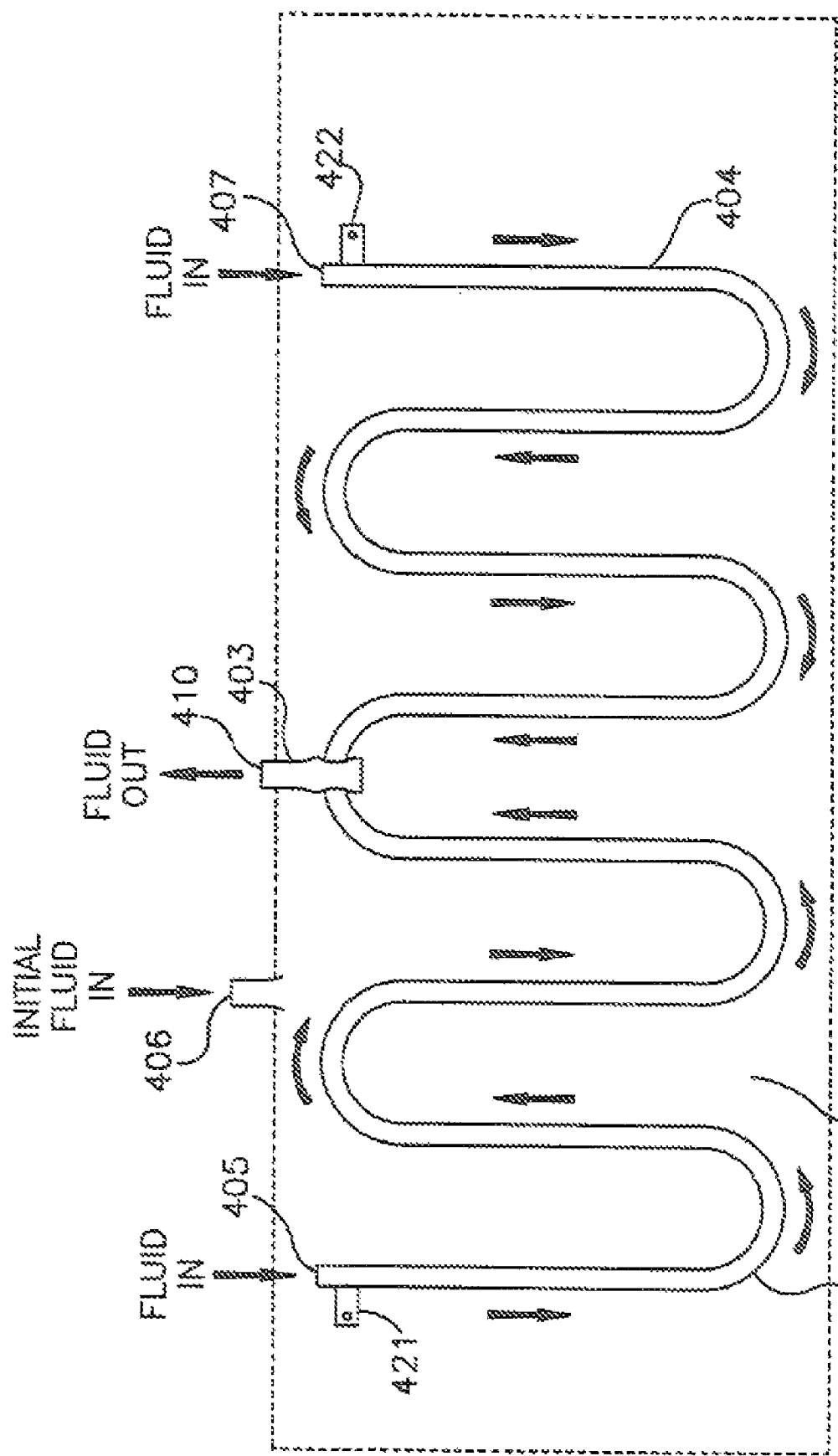
FIG. 33 is an alternate depiction showing a simplified flow diagram for the structure of FIG. 29.

FIGS. 28 and 29 depict another embodiment of a washer control system 10 to address concerns about excessive fluid pressure drop caused by flow through a continuous heater coil. FIG. 29 depicts a heater coil configuration using two coils of the same diameter and wall thickness, joined together by a single adapter used to route fluid to an outlet 410. The heater coil material could be annealed 304 series stainless steel, or other materials high in electrical resistivity. As fluid is dispensed through first port 406, it fills housing reservoir 401. The first coil 402 receives the fluid through first inlet 405. At the same time, second coil 404 receives fluid through second inlet 407, as shown in FIG. 30. First coil 402 is connected to second coil 404 by means of adapter 403, best shown in FIG. 31. The preferred adapter 403 material is copper, made from a powdered metal process. FIG. 31 also shows integrating thermistor 408 and thermal fuse 409 into adapter 403, for measuring coil temperatures as a functional part of control circuit 14. The heated fluid then exits through second port 410 and is routed to the dispense nozzles onto the vehicle windshield, headlamps, etc. The combined fluid flow through each of the first inlet 405 and the second inlet 407 is half that of a continuous length of coil equaling the combined length of the two coils 402 and 404, with a resultant pressure drop equal to one quarter of a continuous coil. FIG. 33 is a schematic representation of the apparatus described in FIGS. 28-31. After reservoir 407 receives fluid through inlet 406, the schematic shows the dual path for the fluid flow through inlets 405 and 407 to outlet 410. Terminals 421 and 422 represent power connections to provide continuous current flow path for the entire length of combined heater coils 402 and 404.

Figure 32:
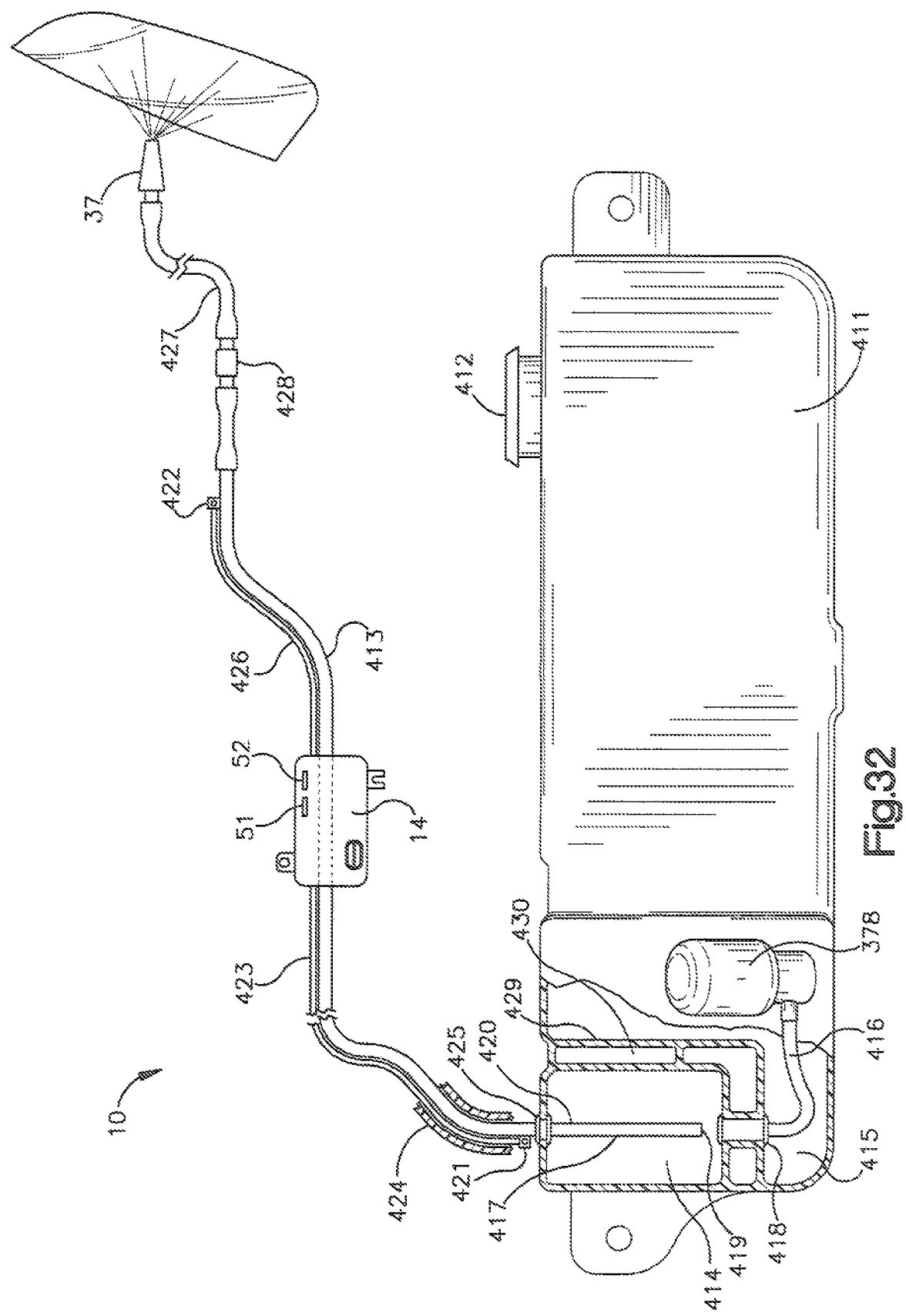
FIG. 32 is a schematic depiction of another alternate embodiment of a washer control system where a heating element is integrated into a fluid bottle on a motor vehicle.

FIG. 32 is a front view of another embodiment where a heating element is integrated into a fluid bottle on a motor vehicle, and where the fluid supply line serves as the heating element. The configuration depicts a cross-sectioned area of dual chambered fluid bottle 411, which is filled through filler neck 412 allowing fluid to enter into first chamber 415. Pump 378, exteriorly mounted to an outer wall of chamber 415, draws fluid from chamber 415 through hose connection 416, and dispenses into second chamber 414 through port 418. Pump 378 is generally located for capability of drawing fluid from the bottom level of bottle 411 for pumping fluid to a near empty condition. As chamber 414 is pressurized, fluid is forced into an inlet 419 of continuous length heater tube 413. A first segment 417 of continuous length heater tube 413 is positioned inside walled chamber 414, and includes an opening or openings 420 at the highest elevation of the segment to allow an escape of trapped air as fluid fills the chamber 414. The heater tube 413 exits chamber 414 through a grommet seal 425 and includes electrical terminal connections 421 and 422 on each end. The segment of heater tube 413 exterior to fluid bottle 411 is the active heater element of washer control system 10. Heater tube 413 extends continuously through control circuit 14. Conductor wire 423 connects to terminal 421, and terminates to electrical battery connection 51 inside control circuit 14. Conductor wire 426 connects to terminal 422, and terminates to ground connection 52 inside control circuit 14. As power is applied, the fluid inside heater tube 413 is rapidly heated before exiting through flexible tube 427 and routed to the dispense nozzles 37 onto the vehicle windshield, headlamps, etc. Pressure sensitive check valve 428 could be used to effectively stop fluid flow between heater tube 413 and nozzles 37 at the conclusion of user activation and limit the dispensing of unwanted cool fluid to a small amount during the next user command. Heater tube 413 and conductor wires 423, 426 could be routed parallel to each other, and insulated commonly with a sleeve 424, which has thermal insulating properties to prevent heat loss. Sleeve 424 could also provide for environmental sealing of terminal connections 421, 422. The larger unheated volume of fluid is contained in the first chamber 415 of the fluid bottle 411, and double walled chamber 414 acts as a reserve for additional fluid, conductively heated by the first segment 417 of continuous length heater tube 413. The double wall 429 is separated by one or more air cavity features 430, providing insulation between the colder fluid contained in first chamber 415 and the conductively heated fluid contained in the second chamber 414, thereby conserving heat loss and energy.

While the invention has been described with a degree of particularity, it is the intent that the invention includes all modifications and alterations from the disclosed design falling within the spirit or scope of the appended claims.

The invention claimed is:

1. Apparatus for providing a heated cleaning fluid to a vehicle surface comprising:
   a) an inlet port for receiving an amount of fluid;
   b) a reservoir in fluid communication with the inlet port for storing fluid which enters a reservoir interior from the inlet port, said reservoir including an expandable portion that expands when fluid in the reservoir freezes to prevent damage to the reservoir;
   c) an outlet port in fluid communication with the reservoir for dispensing an amount of fluid;
   d) a heating element for heating fluid that passes from the inlet to the outlet;
   e) a voltage source coupled to the heating element for energizing the heating element;
   f) a temperature sensor for monitoring a temperature of either the heating element or fluid within the reservoir; and
   g) a control circuit coupled to said temperature sensor for controlling heating of the fluid exiting from the outlet port by selectively energizing and de-energizing at least a portion of the heating element with voltage from the voltage source based on input from the temperature sensor while preventing the fluid from reaching a boiling point of the fluid.

2. The apparatus of claim 1 wherein the expandable portion comprises a rubber boot that covers an open end of the reservoir.

3. The apparatus of claim 1 wherein the expandable portion comprises a rubber boot that covers a lower end of the reservoir.

4. The apparatus of claim 1 wherein the expandable portion comprises a flexible boot that fits over one end of the reservoir and flexes outwardly to accommodate expansion of fluid within the reservoir.

5. The apparatus of claim 1 wherein the heating element is made from stainless steel.

6. The apparatus of claim 1 wherein fluid flows from the inlet port, through the heating element, to the outlet port.

7. The apparatus of claim 1 wherein the control circuit prevents the fluid from being heated to temperatures above 150 degrees Fahrenheit.

8. Apparatus for providing a heated cleaning fluid to a vehicle surface comprising:
   a) an inlet port for receiving an amount of fluid;
   b) a reservoir in fluid communication with the inlet port for receipt of fluid entering a reservoir interior from the inlet port;
   c) a stainless steel heating element through which fluid flows as the fluid flows into or out of the reservoir;
   d) a temperature sensor coupled directly to the heating element,
   e) an outlet port in fluid communication with the reservoir for dispensing an amount of heated fluid; and
   f) a control circuit that selectively energizes and de-energizes at least a portion of the heating element with a voltage based on an input from the temperature sensor to heat the heating element and the fluid passing from the inlet, through the heating element, to the outlet and prevent the fluid from reaching a boiling point of the fluid.

9. Apparatus for providing a heated cleaning fluid to a vehicle surface comprising:
   an inlet port for receiving an amount of fluid;
   a heating reservoir for heating fluid entering the inlet;
   a heating element in contact with fluid as the fluid flows from the inlet port into said reservoir;
   an outlet port in fluid communication with the reservoir for dispensing an amount, of heated fluid;
   a temperature sensor thermally coupled to the heating element; and
   a control circuit for energizing at least a portion of the heating element with a voltage to heat the heating element and the fluid passing from the inlet, in contact with the heating element, to the outlet, said control circuit i) responding to a user input by monitoring a temperature signal from the temperature sensor and ii) if the sensed temperature of the heating element is below a predetermined value, energizing and de-energizing at least a portion of the heating element based on an input from the temperature sensor to raise the temperature of the fluid while preventing the fluid from reaching a boiling point of the fluid.

10. Apparatus for providing a heated cleaning fluid to a vehicle surface comprising:
 a) an inlet port for receiving an amount of fluid;
 b) a reservoir in fluid communication with the inlet port for receipt of fluid entering a reservoir interior from the inlet port;
 c) a stainless steel heating element through which fluid flows as the fluid flows into or out of the reservoir;
 d) an outlet port in fluid communication with the reservoir for dispensing an amount of heated fluid; and
 e) a control circuit for energizing at least a portion of the heating element with a voltage to heat the heating element and the fluid passing from the inlet, through the heating element, to the outlet and prevent the fluid from being heated to temperatures above 150 degrees Fahrenheit.

11. Apparatus for providing a heated cleaning fluid to a vehicle surface comprising:
 a) air inlet port for receiving an amount of fluid;
 b) a reservoir having a generally cylindrical outer surface in fluid communication with the inlet port for receipt of fluid entering a reservoir interior from the inlet port;
 c) a stainless steel heating element comprising an elongated tube wound in a spiral configuration that encircles at least a portion of the reservoir through which fluid flows as the fluid flows into or out of the reservoir that is positioned in relation to the reservoir to convey heat into the reservoir in addition to heating fluid passing through the tube;
 d) an outlet port in fluid communication with the reservoir for dispensing an amount of heated fluid; and
 e) a control circuit for energizing at least a portion of the heating element with a voltage to heat the heating element and the fluid passing from the inlet, through the heating element, to the outlet.

* * * * *